United States Patent
Singh et al.

(10) Patent No.: US 9,635,146 B2
(45) Date of Patent: Apr. 25, 2017

(54) METHOD OF USING BIT VECTORS TO ALLOW EXPANSION AND COLLAPSE OF HEADER LAYERS WITHIN PACKETS FOR ENABLING FLEXIBLE MODIFICATIONS AND AN APPARATUS THEREOF

(71) Applicant: CAVIUM, INC., San Jose, CA (US)

(72) Inventors: Chirinjeev Singh, San Jose, CA (US); Tsahi Daniel, Palo Alto, CA (US); Gerald Schmidt, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 181 days.

(21) Appl. No.: 14/309,659

(22) Filed: Jun. 19, 2014

(65) Prior Publication Data

US 2015/0373160 A1    Dec. 24, 2015

(51) Int. Cl.
*H04L 29/06* (2006.01)
*H04L 12/935* (2013.01)

(52) U.S. Cl.
CPC .......... *H04L 69/22* (2013.01); *H04L 49/3009* (2013.01); *H04L 69/04* (2013.01); *H04L 69/08* (2013.01)

(58) Field of Classification Search
None
See application file for complete search history.

(56) References Cited

U.S. PATENT DOCUMENTS

| | | |
|---|---|---|
| 5,781,729 A | 7/1998 | Baker et al. |
| 5,805,808 A | 9/1998 | Hasani et al. |
| 6,088,356 A | 7/2000 | Hendel et al. |
| 6,341,129 B1 | 1/2002 | Schroeder et al. |
| 6,606,301 B1 | 8/2003 | Muller et al. |
| 6,789,116 B1 | 9/2004 | Sarkissian et al. |
| 7,187,694 B1 | 3/2007 | Liao |
| 7,359,403 B1 | 4/2008 | Rinne |
| 7,367,052 B1 | 4/2008 | Desanti |
| 7,391,735 B2 | 6/2008 | Johnson |
| 7,568,047 B1 | 7/2009 | Aysan et al. |
| 7,606,263 B1 | 10/2009 | Parker |
| 7,710,959 B2 | 5/2010 | Ramasamy et al. |
| 7,715,611 B2 | 5/2010 | Eaton et al. |
| 7,822,032 B1 | 10/2010 | Parker et al. |
| 7,903,689 B2 | 3/2011 | Niinomi et al. |
| 8,031,640 B2 | 10/2011 | Mitsumori |
| 8,054,744 B1 | 11/2011 | Bishara et al. |

(Continued)

*Primary Examiner* — Chi H Pham
*Assistant Examiner* — Raul Rivas
(74) *Attorney, Agent, or Firm* — Haverstock & Owens LLP

(57) ABSTRACT

Embodiments of the apparatus for modifying packet headers relate to a use of bit vectors to allow expansion and collapse of protocol headers within packets for enabling flexible modification. A rewrite engine expands each protocol header into a generic format and applies various commands to modify the generalized protocol header. The rewrite engine maintains a bit vector for the generalized protocol header with each bit in the bit vector representing a byte of the generalized protocol header. A bit marked as 0 in the bit vector corresponds to an invalid byte, while a bit marked as 1 in the bit vector corresponds to a valid byte. The rewrite engine uses the bit vector to remove all the invalid bytes after all commands have been operated on the generalized protocol header to thereby form a new protocol header.

25 Claims, 24 Drawing Sheets

(56) References Cited

U.S. PATENT DOCUMENTS

| | | |
|---|---|---|
| 8,112,800 B1 | 2/2012 | Yang et al. |
| 8,144,706 B1 | 3/2012 | Daniel et al. |
| 8,576,173 B2 | 11/2013 | Verhaegh |
| 8,705,533 B1 | 4/2014 | Venkatraman |
| 8,804,733 B1 | 8/2014 | Safrai |
| 9,313,115 B2 | 4/2016 | Kamerkar et al. |
| 2001/0050914 A1 | 12/2001 | Akahane et al. |
| 2002/0016852 A1 | 2/2002 | Nishihara |
| 2002/0062394 A1 | 5/2002 | Bunn et al. |
| 2002/0076142 A1 | 6/2002 | Song |
| 2002/0083210 A1 | 6/2002 | Harrison et al. |
| 2002/0163935 A1 | 11/2002 | Paatela et al. |
| 2002/0191521 A1 | 12/2002 | Minamino et al. |
| 2003/0037154 A1 | 2/2003 | Poggio et al. |
| 2003/0152078 A1 | 8/2003 | Henderson et al. |
| 2003/0193949 A1 | 10/2003 | Kojima et al. |
| 2003/0210702 A1 | 11/2003 | Kendall |
| 2003/0218978 A1 | 11/2003 | Brown |
| 2003/0231625 A1 | 12/2003 | Calvignac et al. |
| 2004/0064589 A1 | 4/2004 | Boucher et al. |
| 2005/0076228 A1 | 4/2005 | Davis |
| 2005/0213570 A1 | 9/2005 | Stacy et al. |
| 2005/0232303 A1 | 10/2005 | Deforche et al. |
| 2005/0276230 A1 | 12/2005 | Akahane et al. |
| 2005/0281281 A1 | 12/2005 | Nair et al. |
| 2006/0039372 A1 | 2/2006 | Sarkinen et al. |
| 2006/0168309 A1 | 7/2006 | Sikdar et al. |
| 2006/0215695 A1 | 9/2006 | Olderdissen |
| 2006/0280178 A1 | 12/2006 | Miller et al. |
| 2007/0078997 A1 | 4/2007 | Stern |
| 2008/0008159 A1 | 1/2008 | Bourlas et al. |
| 2009/0067325 A1 | 3/2009 | Baratakke et al. |
| 2009/0234818 A1 | 9/2009 | Lobo et al. |
| 2009/0238190 A1 | 9/2009 | Cadigan, Jr. et al. |
| 2010/0161787 A1 | 6/2010 | Jones |
| 2010/0272125 A1 | 10/2010 | Franke et al. |
| 2010/0329255 A1* | 12/2010 | Singhal ............... H04L 49/9042 370/392 |
| 2011/0022732 A1 | 1/2011 | Hutchison et al. |
| 2011/0058514 A1 | 3/2011 | Lee et al. |
| 2011/0134920 A1 | 6/2011 | Dyke |
| 2011/0142070 A1 | 6/2011 | Lim et al. |
| 2011/0261698 A1 | 10/2011 | Kamerkar et al. |
| 2011/0261812 A1 | 10/2011 | Kini et al. |
| 2011/0268123 A1 | 11/2011 | Kopelman et al. |
| 2011/0310892 A1 | 12/2011 | DiMambro |
| 2012/0281714 A1 | 11/2012 | Chang et al. |
| 2013/0039278 A1 | 2/2013 | Bouazizi et al. |
| 2013/0163427 A1 | 6/2013 | Beliveau et al. |
| 2013/0163475 A1 | 6/2013 | Beliveau et al. |
| 2013/0215906 A1 | 8/2013 | Hidai |
| 2013/0238792 A1 | 9/2013 | Kind et al. |
| 2014/0119231 A1 | 5/2014 | Chan et al. |
| 2014/0153443 A1 | 6/2014 | Carter |
| 2014/0269307 A1 | 9/2014 | Banerjee et al. |
| 2014/0328354 A1 | 11/2014 | Michael |
| 2014/0369365 A1 | 12/2014 | Denio et al. |
| 2015/0081726 A1 | 3/2015 | Izenberg |
| 2015/0189047 A1 | 7/2015 | Naaman et al. |
| 2015/0222533 A1 | 8/2015 | Birrittella et al. |
| 2015/0277911 A1 | 10/2015 | Khartikov et al. |

* cited by examiner

| Layer0 | Layer1 | Layer2 | Layer4 | Layer5 | Layer6 | Layer7 |
|--------|--------|--------|--------|--------|--------|--------|
| ETHERNET | IPV4 | ICMP | | | | |
| ETHERNET | IPV4 | IGMP | | | | |
| ETHERNET | IPV4 | TCP | | | | |
| ETHERNET | IPV4 | UDP | | | | |
| ETHERNET | IPV4 | UDP | VxLAN | ETHERNET | | |
| ETHERNET | IPV4 | UDP | VxLAN | ETHERNET | ARP | |
| ETHERNET | IPV4 | UDP | VxLAN | ETHERNET | IPv4 | |

Fig. 1

Format of a double tagged Ethernet header

Bit Vector

Byte Numbering

Format of a single tagged Ethernet header

| SA (6 Bytes) | DA (6 Bytes) | Customer VLAN Tag (4Bytes) | ETHERTYPE (2Bytes) |
|---|---|---|---|

Fig. 7A

Format of the single tagged Ethernet header in generic format

| SA (6 Bytes) | DA (6 Bytes) | Service VLAN Tag (4Bytes) Marked Invalid | Customer VLAN Tag (4Bytes) | ETHERTYPE (2Bytes) |
|---|---|---|---|---|

Fig. 7B

Bit Vector

| 1 | 1 | 1 | 1 | 1 | 1 | 1 | 1 | 1 | 1 | 1 | 1 | 0 | 0 | 0 | 0 | 1 | 1 | 1 | 1 | 1 | 1 |
|---|---|---|---|---|---|---|---|---|---|---|---|---|---|---|---|---|---|---|---|---|---|

Byte Numbering

| 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|

Fig. 7C

Format of an untagged Ethernet header

| SA (6 Bytes) | DA (6 Bytes) | ETHERTYPE (2Bytes) |
|---|---|---|

Fig. 8A

Format of the untagged Ethernet header in generic format

| SA (6 Bytes) | DA (6 Bytes) | Service VLAN Tag (4Bytes) Marked Invalid | Customer VLAN Tag (4Bytes) Marked Invalid | ETHERTYPE (2Bytes) |
|---|---|---|---|---|

Fig. 8B

Bit Vector

| 1 | 1 | 1 | 1 | 1 | 1 | 1 | 1 | 1 | 1 | 1 | 1 | 0 | 0 | 0 | 0 | 0 | 0 | 0 | 0 | 1 | 1 |
|---|---|---|---|---|---|---|---|---|---|---|---|---|---|---|---|---|---|---|---|---|---|

Byte Numbering

| 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|

Format of a single tagged Ethernet header

| SA (6 Bytes) | DA (6 Bytes) | Customer VLAN Tag (4Bytes) | ETHERTYPE (2Bytes) |

Format of the single tagged Ethernet header in generic format

| SA (6 Bytes) | DA (6 Bytes) | Service VLAN Tag (4Bytes) Marked Invalid | Customer VLAN Tag (4Bytes) | ETHERTYPE (2Bytes) |

Bit Vector

| 1 | 1 | 1 | 1 | 1 | 1 | 1 | 1 | 1 | 1 | 1 | 1 | 0 | 0 | 0 | 0 | 1 | 1 | 1 | 1 | 1 | 1 |

Byte Numbering

| 0 | 1 | 2 | 3 | 4 | 5 | 6 | 7 | 8 | 9 | 10 | 11 | 12 | 13 | 14 | 15 | 16 | 17 | 18 | 19 | 20 | 21 |

Fig. 9C

Format of an untagged Ethernet header in generic format

| SA (6 Bytes) | DA (6 Bytes) | Service VLAN Tag (4Bytes) Marked Invalid | Customer VLAN Tag (4Bytes) Marked Invalid | ETHERTYPE (2Bytes) |
|---|---|---|---|---|

Fig. 9D

Bit Vector

| 1 | 1 | 1 | 1 | 1 | 1 | | | | | | | 0 | 0 | 0 | 0 | | | | | 1 | 1 |
|---|---|---|---|---|---|---|---|---|---|---|---|---|---|---|---|---|---|---|---|---|---|
| | | | | | | 1 | 1 | 1 | 1 | 1 | 1 | | | | | 0 | 0 | 0 | 0 | | |

Byte Numbering

| 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|

Fig. 9E

Format of an untagged Ethernet header after modifications

| SA (6 Bytes) | DA (6 Bytes) | ETHERTYPE (2Bytes) |
|---|---|---|

Fig. 9F

Format of an untagged Ethernet header in generic format

| SA (6 Bytes) | DA (6 Bytes) | Service VLAN Tag (4Bytes) Marked Invalid | Customer VLAN Tag (4Bytes) Marked Invalid | ETHERTYPE (2Bytes) |
|---|---|---|---|---|

Fig. 10C

Bit Vector

| 1 | 1 | 1 | 1 | 1 | 1 | | | | | | | 0 | 0 | 0 | 0 | | | | | 1 | 1 |
|---|---|---|---|---|---|---|---|---|---|---|---|---|---|---|---|---|---|---|---|---|---|
| | | | | | | 1 | 1 | 1 | 1 | 1 | 1 | | | | | 0 | 0 | 0 | 0 | | |

Byte Numbering

| 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|

Fig. 10D

Format of an untagged Ethernet header after modifications

| SA (6 Bytes) | DA (6 Bytes) | ETHERTYPE (2Bytes) |
|---|---|---|

Fig. 10E

METHOD OF USING BIT VECTORS TO ALLOW EXPANSION AND COLLAPSE OF HEADER LAYERS WITHIN PACKETS FOR ENABLING FLEXIBLE MODIFICATIONS AND AN APPARATUS THEREOF

FIELD OF INVENTION

The present invention relates to packet header modifications. More particularly, the present invention relates to a method of using bit vectors to allow expansion and collapsing of header layers within packets for enabling flexible modifications and an apparatus thereof.

BACKGROUND OF THE INVENTION

A network packet carries data via protocols that the Internet uses, such as Transmission Control Protocol/Internet Protocol/Ethernet Protocol (TCP/IP/Ethernet). A typical switch is able to modify various fields of incoming packets prior to sending the packets out to a destination or to another switch. Incoming packets are modified for various reasons, such as where the packets are being forwarded to, the protocol the destination supports, priority of the packets, incoming format of the protocol header, etc. Since network protocols are evolving, one or more fields of a protocol header can be optional, which complicates the hardware of the switch as a given field within a protocol header may not be always at a fixed offset.

During modification of a packet, the prior art switch linearly processes each protocol layer in the packet. Such processing can create network related performance issues, including latency, which can cause an implementation to overprovision processing resources.

BRIEF SUMMARY OF THE INVENTION

Embodiments of the apparatus for modifying packet headers relate to a use of bit vectors to allow expansion and collapse of protocol headers within packets for enabling flexible modification. A rewrite engine expands each protocol header into a generic format and applies various commands to modify the generalized protocol header. The rewrite engine maintains a bit vector for the generalized protocol header with each bit in the bit vector representing a byte of the generalized protocol header. A bit marked as 0 in the bit vector corresponds to an invalid byte, while a bit marked as 1 in the bit vector corresponds to a valid byte. The rewrite engine uses the bit vector to remove all the invalid bytes after all commands have been operated on the generalized protocol header to thereby form a new protocol header.

In one aspect, a method of a rewrite engine is provided. The method includes maintaining a bit vector for each generalized protocol header. The generalized protocol header is a protocol header of a packet expanded to a generic format. The generic format includes all possible fields of the protocol. Each of the fields has the same offset irrespective of which variation of the protocol the protocol header corresponds to. The bit vector includes a bit per byte for each byte of the generalized protocol header.

The method also includes updating the bit vector based on modification of at least one generalized protocol header. In some embodiments, the modification uses at least one command from a set of generic commands that is stored in a memory of the network switch to modify the at least one generalized protocol header.

The method also includes using the updated bit vector to compress the at least one generalized protocol header. In some embodiments, prior to using the updated bit vector, an XOR operation is performed on the bit vector and the updated bit vector to determine how many bits changed, which allows the rewrite engine to account for the bytes deleted and added.

In another aspect, a method of a network switch is provided. The method includes receiving a packet at an incoming port of the network switch, and generalizing each protocol header of the packet according to a generic format for the protocol header. Missing fields from the protocol header of the packet are detected. Based on the detection, the protocol header is expanded to the generic format by including the missing fields.

The method also includes maintaining a bit vector for each generalized protocol header. The bit vector includes bits marked as 0 for invalid fields and bits marked as 1 for valid fields.

The method also includes modifying at least one of the generalized protocol header, thereby updating the bit vector. In some embodiments, the modification uses at least one command from a set of generic commands that is stored in a memory of the network switch to modify the at least one generalized protocol header. In some embodiments, the modification of the at least one generalized protocol header is based on egress portType of the outgoing port of the network switch.

The method also includes collapsing the updated bit vector. In some embodiments, the updated bit vector is collapsed by shifting the updated bit vector to remove each bit marked as 0 in the updated bit vector.

The method also includes forming a compact protocol header based on the collapsed bit vector. The packet with at least the compact protocol header is transmitted via an outgoing port of the network switch. In some embodiments, prior to the packet being transmitted, a number of bytes added or deleted for all operations performed is counted.

In yet another aspect, a network switch is provided. The network switch includes an input port for receiving a packet and a memory storing a set of generic commands. The set of generic commands is used for header modifications irrespective of incoming headers. In some embodiments, the set of generic commands include a Delete command, a Copy command and a Move command.

The network switch also includes a rewrite engine. The rewrite engine uses bit vectors to allow expansion and collapse of protocols headers of the packet, thereby enabling flexible modification of the packet by using the set of generic commands.

In some embodiments, each of the protocol headers is generalized according to one of software-defined mappings that is specific to a corresponding protocol. In some embodiments, the software-defined mappings are stored in the memory.

Each generalized protocol header includes a bit vector with bits marked as 0 for invalid fields and bits marked as 1 for valid fields. In some embodiments, the rewrite engine updates the bit vector after the generalized protocol header is modified. In some embodiments, the rewrite engine removes each bit marked as 0 in the updated bit vector to collapse the updated bit vector. A new header is formed based on the collapsed bit vector.

In some embodiments, the network switch also includes an outgoing port for transmitting the packet with the new header.

In yet another aspect, a network switch is provided. The network switch includes an input port for receiving a packet, wherein the packet includes a body and a protocol stack. The network switch also includes an output port for transmitting modified packets. The network switch also includes a memory to store a set of software-defined mappings of generic formats of protocols and a set of generic modification commands. Typically, the set of generic modification commands is used for header modifications irrespective of incoming headers.

The network switch also includes a rewrite engine. The rewrite engine converts each protocol header of the protocol stack into a generic format based on one from the set of software-defined mappings, and maintains a bit vector for each converted protocol header. The bit vector includes a bit per byte for each byte of the converted protocol header. The bit vector includes bits marked as 0 for invalid fields of the converted protocol header and bits marked as 1 for valid fields of the converted protocol header. The rewrite engine uses the set of generic modifications commands to modify each converted protocol header, updates each bit vector after the bit vector, collapses each updated bit vector to thereby form a new protocol stack, and attaches the new protocol stack with the body to be transmitted via the output port.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 illustrates exemplary protocol layer combinations of packets.

FIGS. 7A-7C illustrate another exemplary generalization of a protocol header in accordance with some embodiments of the present invention.

FIGS. 8A-8C illustrate yet another exemplary generalization of a protocol header in accordance with some embodiments of the present invention.

FIGS. 9A-9F illustrate an exemplary modification of a protocol header in accordance with some embodiments of the present invention.

FIGS. 10A-10E illustrate another exemplary modification of a protocol header in accordance with some embodiments of the present invention.

DETAILED DESCRIPTION OF THE INVENTION

Figure 2:
FIG. 2 illustrates an exemplary structure of a local protocol table in accordance with some embodiments of the present invention.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Introduction

A network device, such as a network switch, is able to switch/route network traffic. The network switch includes at least one input/incoming port and at least one output/outgoing port for receiving and transmitting packets. In some embodiments, the network switch also includes a parser and a rewriter. The parser can include one or more parser engines to identify contents of network packets, and the rewriter can include one or more rewrite engines to modify packets before they are transmitted out from the network switch. The parser engine(s) and the rewrite engine(s) are flexible and operate on a programmable basis.

The network switch also includes memory to store data used by the network switch. For example, the memory stores a set of generic commands. Briefly, the generic commands are typically used to modify protocol headers. For another example, the memory also stores software-defined mappings of generic formats of protocols. Briefly, each protocol header is represented according to one of the software-defined mappings that is specific to a corresponding protocol. As it will become evident, these mappings can be used on different variations of a protocol as well as on different protocols, including new protocols. For yet another example, the memory also stores a protocol table. Briefly, the protocol table includes layer information of each protocol layer of each protocol layer combination that is programmed into the protocol table. For yet another example, the memory also stores counters and statistics.

In Ethernet, packets include multiple protocol layers. Each protocol layer carries different information. Some examples of well known layers are:
Ethernet
PBB Ethernet
ARP
IPV4
IPV6
MPLS
FCOE
TCP
UDP
ICMP
IGMP
GRE
ICMPv6
VxLAN
TRILL
CNM Theoretically, the protocol layers can occur in any order. However, only some well-known combinations of these layers occur. Some examples of valid combinations of these layers are:
Ethernet
Ethernet, ARP
Ethernet, CNM
Ethernet, FCoE
Ethernet, IPV4
Ethernet, IPV4, ICMP
Ethernet, IPV4, IGMP Unique Packet Identifier In some embodiments, the network switch supports 17 protocols and eight protocol layers. There are therefore $8^{17}$ possible protocol layer combinations. FIG. 1 illustrates exemplary protocol layer combinations of packets. For example, a packet can include a three protocol layer combination such as Ethernet, IPv4 and ICMP. For another example, a packet can include a seven protocol layer combination such as, Ethernet, IPv4, UDP, VxLAN, Ethernet and ARP.

Although there are $8^{17}$ possible protocol layer combinations, only some well-known combinations of these layers occur. All known protocol layer combinations are uniquely identified and translated into a unique number called the packet identifier (PktID). The protocol table stored in the memory of the network switch is programmed to include layer information of each layer of each known protocol layer combination. In practice, the local protocol table includes less than 256 protocol layer combinations. In some embodiments, this local table includes 212 known protocol layer combinations. The local table is programmed to include more or less protocol layer combinations.

FIG. 2 illustrates an exemplary structure of the local protocol table 200 in accordance with some embodiments of the present invention. Each protocol layer combination in the local table 200, which is indexed using PktID, includes information for each protocol layer of that protocol layer combination, which is shown as Layer0 Information, Layer1 Information and LayerN Information. By indexing the PktID, information for all N layers of a packet can be accessed or retrieved.

The information for each protocol layer includes at least the following: Layer Type, Layer Data Offset and Miscellaneous Information. However, more information can be stored in the local table 200. Briefly, the Layer Type refers to an associated protocol (e.g., IP/TCP/UDP/Ethernet) of the protocol layer, Layer Data Offset provides a start location of layer data in the protocol layer, and the Miscellaneous Information includes data such as checksum and length data.

Typically, the parser engine is able to identify the PktID of an incoming packet received at the network switch. The rewrite engine uses the PktID as key to the protocol table, which gives the rewrite engine all the information needed to generalize each protocol layer of the packet for modification. In other words, the rewrite engine uses the PktID to access or retrieve information for each of the protocol layers in the packet from the protocol table, instead of receiving parsed results from the parser engine.

Layer Type. The unique combination of the Layer Type and a hash on one or more fields of the packet provides the rewrite engine a "generic format" for each protocol layer. In some embodiments, this unique combination specifies one of software-defined mappings of generic formats of protocols that are stored in the memory. The generic format is used by the rewrite engine to expand the protocol layers and to modify the protocol layers using software commands. This information also tells the rewrite engine where each protocol layer starts within the packet.

Layer Data Offset. The rewrite engine uses data to modify an incoming header layer. This data can be spread anywhere in the packet. Since layer sizes can vary, so can the offsets to the data that the rewrite engine needs to use during modifications, which limits hardware flexibility on what data the rewrite engine can pick up and from where.

Extracted data from incoming packet headers are arranged in a layered manner. The extracted data structure is arranged such that starting offsets of layer-data-structure is unique per PktID. The Layer Data Offset of each layer is used to identify the location of the extracted data for modifications. Since the structure of the layers within a packet and locations of the extracted data from the layers are identified through the PktID of the packet, software and hardware uses the same unique identifier to manage the extracted data, which simplifies the commands in the rewrite engine.

Miscellaneous information. Information, such as checksum and length data, tells the rewrite engine about special handing requirements, such as checksum re-calculation and header length update, for the associated protocol layer.

The packet generalization scheme allows software to define a small set of generic commands, which is purely based on a given protocol layer and is independent of the layers preceding or proceeding this protocol layer. The packet generalizations scheme also provides hardware flexibility to future-proof itself against protocol changes and additions.

Figure 3:
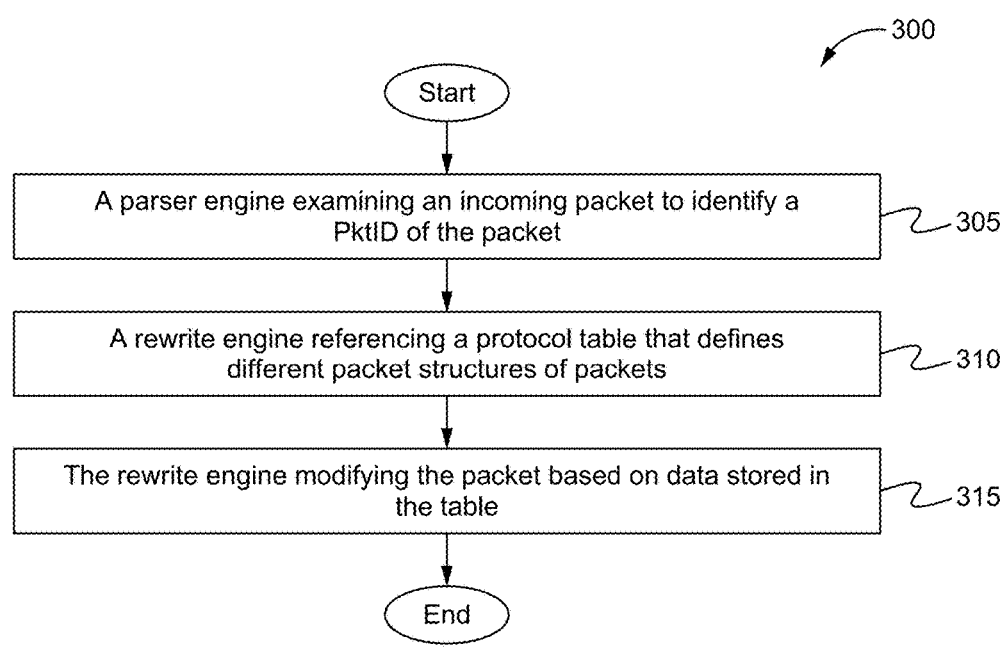
FIG. 3 illustrates an exemplary method of a network switch in accordance with some embodiments of the present invention.

FIG. 3 illustrates an exemplary method 300 of the network switch in accordance with some embodiments of the present invention. The network switch typically includes the parser engine and the rewrite engine.

At a step 305, the parser engine examines an incoming packet to identify a PktID of the packet. In some embodiments, the parser engine passes the PktID to the rewrite engine rather than passing parsed data of the packet to the rewrite engine.

At a step 310, the rewrite engine references a protocol table that defines different packet structures of packets received by the network switch. The rewrite engine uses the PktID as a key to the protocol table to extract information for each protocol layer of the packet necessary for modification.

At a step 315, the rewrite engine modifies the packet based on data stored in the protocol table. Typically, the rewrite engine expands each protocol layer of the packet prior to modifying the packet. Protocol layer expansion and modification are discussed elsewhere.

Figure 4:
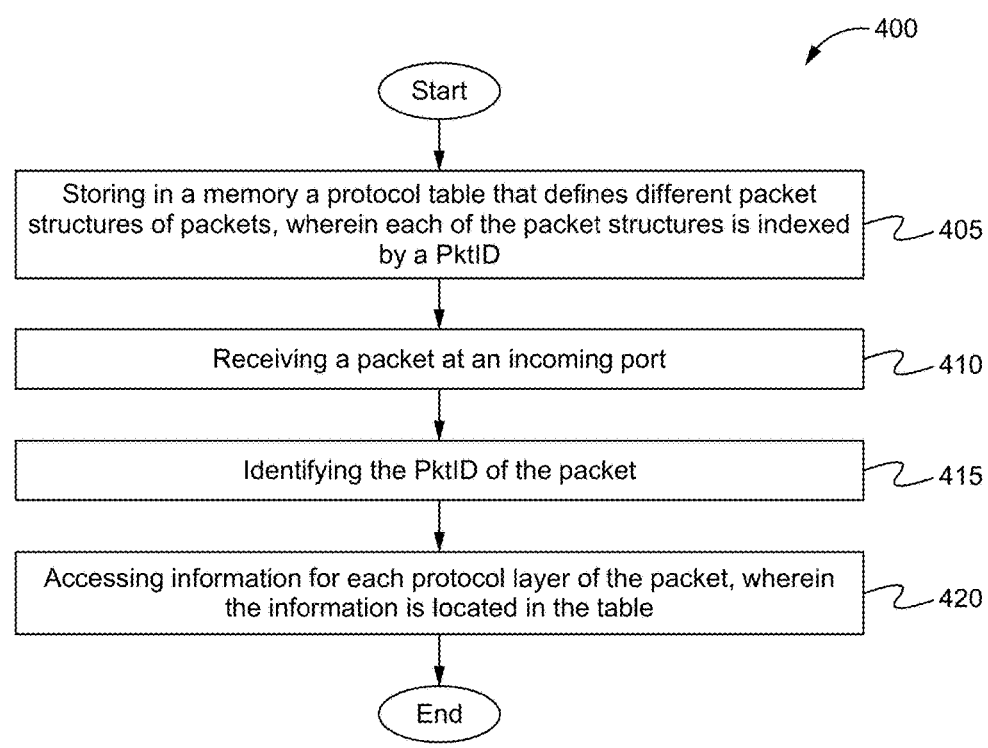
FIG. 4 illustrates another exemplary method of the network switch in accordance with some embodiments of the present invention.

FIG. 4 illustrates another exemplary method 400 of the network switch in accordance with some embodiments of the present invention. The network switch typically includes memory and at least one incoming port.

At a step 405, a protocol table is stored in the memory. The protocol table defines different packet structures of packets. Each of the packet structures is indexed by a PktID. Each of the packet structures represents a protocol layer combination and includes layer information of each protocol layer of the protocol layer combination. The protocol table can be updated to add a new packet structure representative of a new protocol. The protocol table can also be updated to modify a packet structure in response to a change in a protocol.

At a step 410, a packet is received at the incoming port.

At a step 415, the PktID of the packet is identified. In some embodiments, a parser engine identifies the PktID of the packet.

At a step 420, information for each protocol layer of the packet is accessed. Typically, the information is located in the protocol table. In some embodiments, the information is used to generalize the protocol header of the packet according to a generic format for a corresponding protocol. The generic format is software-defined in the memory.

As explained elsewhere, the generalized protocol header can be modified by applying at least one command to the generalized protocol header. In some embodiments, the generalized protocol header is modified by using the information to determine a location of data that is used to modify the generalized protocol header. The rewrite engine of the network switch typically generalizes the protocol header and modifies the generalized protocol header.

Generic Format

As briefly explained above, the rewrite engine represents each protocol header of packets in a generic format specific to a corresponding protocol to enable programmable modifications of packets, resulting in hardware and software flexibility in modifying packet headers.

Figure 5:
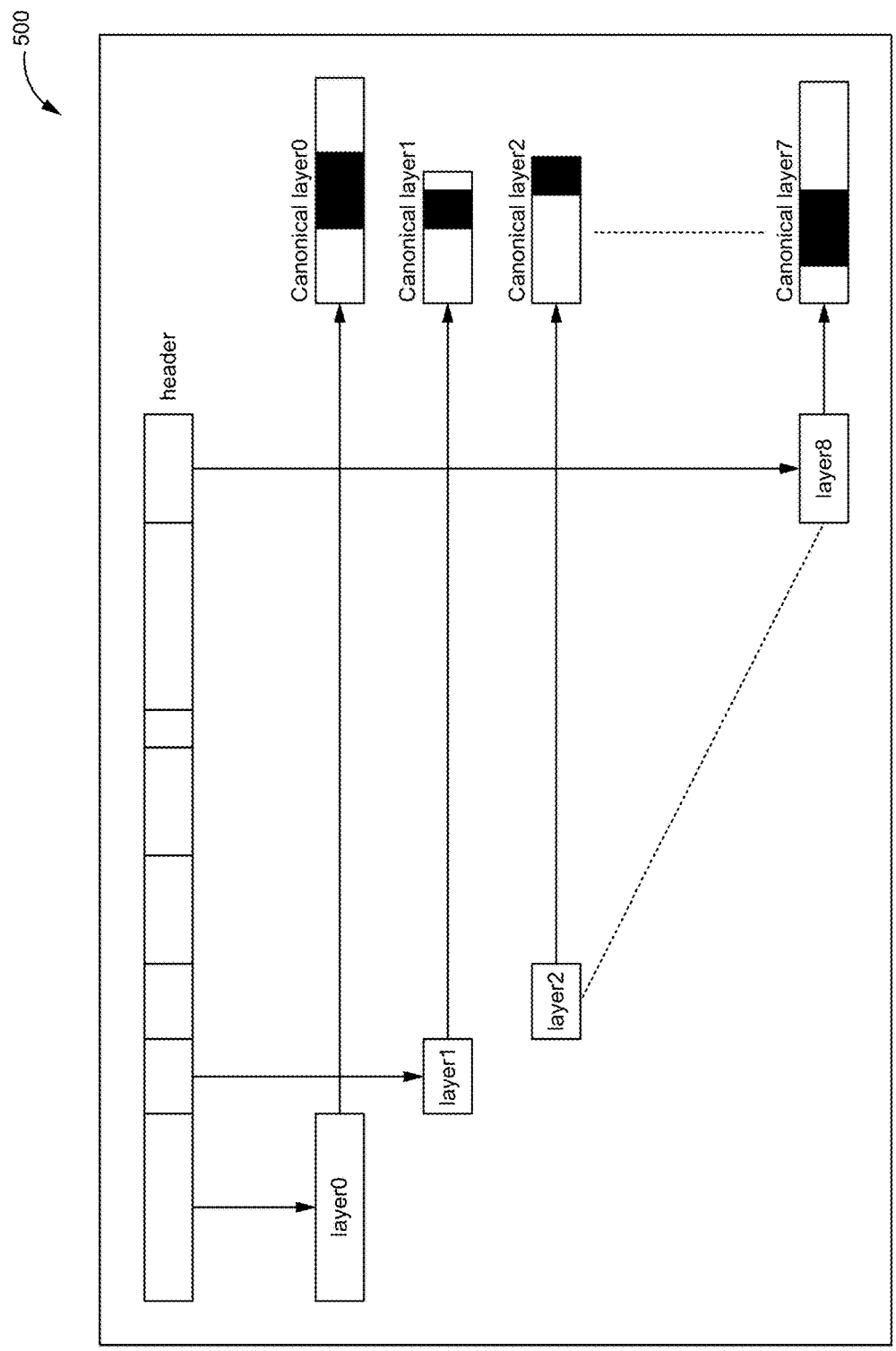
FIG. 5 illustrates diagram of header expansion of layers of an incoming packet to generic formats in accordance with some embodiments of the present invention.

FIG. 5 illustrates diagram 500 of header expansion of layers of an incoming packet to generic formats in accordance with some embodiments of the present invention. In FIG. 5, the incoming packet includes eight header protocol layers. Each protocol layer has a header for a respective protocol. More or less protocol layers are possible as indicated above. The rewrite engine is able to detect missing fields from any of the protocol headers and to expand each protocol header to its generic format as illustrated in FIG. 5. A canonical layer refers to a protocol layer that has been expanded to its generic format. Briefly, each canonical layer includes a bit vector with bits marked as 0 for invalid fields and bits marked as 1 for valid fields.

FIGS. 6A-8C illustrate examples of how the rewrite engine works on the Ethernet protocol in accordance with some embodiments of the present invention. The examples illustrated in FIGS. 6A-8C demonstrate that the rewrite engine is able to work on different variations of a protocol, such as the Ethernet protocol. Each example illustrates an incoming header of the Ethernet protocol and its corresponding generic format. Although other protocols are not discussed, it is noted that the rewrite engine works similarly on the other protocols.

Figure 6A:
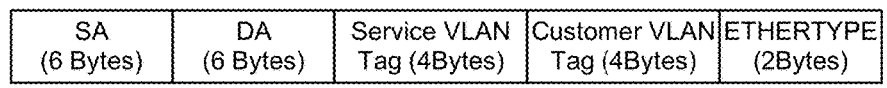
FIGS. 6A-6B illustrate an exemplary generalization of a protocol header in accordance with some embodiments of the present invention.

FIG. 6A illustrates a format 600 of an exemplary Ethernet packet header of an incoming packet. The Ethernet packet header 600 is 22 bytes and includes five fields: a Source Address (SA) field, a Destination Address (DA) field, a Service VLAN Tag field, a Customer VLAN Tag field and an EtherType field. The SA field and the DA field are each 6 bytes. The Service VLAN Tag field and the Customer VLAN Tag field are each 4 bytes. The EtherType field is 2 bytes. The packet with the Ethernet packet header 600 is the biggest variant of an Ethernet packet and has the maximum size of 22 bytes.

Figure 6B:
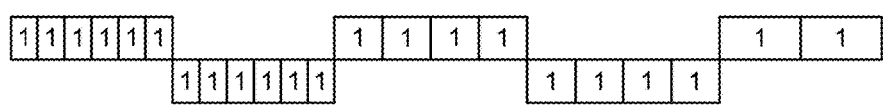
Figure 6B:
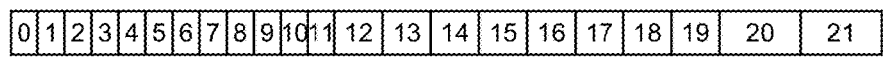

The rewrite engine processes the Ethernet packet header 600 and determines that none of the fields are missing from the Ethernet packet header 600. A generic format of the Ethernet packet header 600 is thus the same as that of the Ethernet packet header 600 since the Ethernet packet header 600 contains all possible fields. FIG. 6B illustrates a bit vector 605 that represents the Ethernet packet header 600 of FIG. 6A. Each bit of the bit vector 605 corresponds to one of the 22 bytes of the Ethernet packet header 600. The bit vector 605 contains all 1's since all the fields of the Ethernet packet header 600 are valid or have values as the fields exist in the Ethernet packet header 600. Accordingly, the Ethernet packet header 600 is represented by the generic format of {22'b111111_111111_1111_1111_11}.

FIG. 7A illustrates a format 700 of another exemplary Ethernet packet header of an incoming packet. The Ethernet packet header 700 is 18 bytes and includes only four fields: the SA field, the DA field, the Customer VLAN Tag field and the EtherType field. The Ethernet packet header 700 is missing the Service VLAN tag field. The packet with the Ethernet packet header 700 is another variant of an Ethernet packet.

The rewrite engine processes the Ethernet packet header 700 and determines that the Service VLAN tag field is missing from the Ethernet packet header 700 and expands the Ethernet packet header 700 to its maximum size of 22 bytes by including the missing Service VLAN tag field at the appropriate location of a generic format of the Ethernet packet header 700. FIG. 7B illustrates the generic format 700' of the expanded Ethernet packet header. The expanded Ethernet packet header 700' includes all possible fields of the Ethernet protocol, including the missing Service VLAN tag field. The valid fields in the expanded Ethernet packet header 700' are the SA field, the DA field, the Customer VLAN Tag field and the EtherType field, as they exist in the Ethernet packet header 700. The invalid field in the expanded Ethernet packet header 700' is the Service VLAN tag field, as it did not exist in the Ethernet packet header 700 but is added in the expanded Ethernet packet header 700'.

FIG. 7C illustrates a bit vector 705 that represents the expanded Ethernet packet header 700' of FIG. 7B. Each bit of the bit vector 705 corresponds to one of the 22 bytes of the expanded Ethernet packet header 700'. The bit vector 705 contains 1's for all valid fields, which are the SA field, the DA field, the Customer VLAN Tag field and the EtherType field. The bit vector 705 contains 0's for all invalid fields, which is only the Service VLAN tag field. Accordingly, the Ethernet packet header 700 is represented by the generic format of {22'b111111_111111_0000_1111_11}.

FIG. 8A illustrates a format 800 of another exemplary Ethernet packet header of an incoming packet. The Ethernet packet header 800 is 14 bytes and includes only three fields:

the SA field, the DA field and the EtherType field. The Ethernet packet header 800 is missing the Service VLAN tag field and the Customer VLAN Tag field. The packet with the Ethernet packet header 800 is the smallest variant of an Ethernet packet.

The rewrite engine processes the Ethernet header 800 and determines that the Service VLAN tag field and the Customer VLAN Tag field are missing from the Ethernet packet header 800 and expands the Ethernet packet header 800 to its maximum size of 22 bytes by including the missing Service VLAN tag field and the missing Customer VLAN Tag field at the appropriate locations of a generic format of the Ethernet packet header 800. FIG. 8B illustrates a generic format 800' of the expanded Ethernet packet header. The expanded Ethernet packet header 800' includes all possible fields of the Ethernet protocol, including the missing the Service VLAN tag field and missing the Customer VLAN Tag field. The valid fields in the expanded Ethernet packet header 800' are the SA field, the DA field and the EtherType field, as they exist in the Ethernet packet header 800. The invalid fields in the expanded Ethernet packet header 800' are the Service VLAN tag field and the Customer VLAN Tag field, as they did not exist in the Ethernet packet header 800 but are added in the expanded Ethernet packet header 800'.

FIG. 8C illustrates a bit vector 805 that represents the expanded Ethernet packet header 800' of FIG. 8B. Each bit of the bit vector 805 corresponds to one of the 22 bytes of the expanded Ethernet packet header 800'. The bit vector 805 contains 1's for all valid fields, which are the SA field, the DA field and the EtherType field. The bit vector 805 contains 0's for all invalid fields, which are the Service VLAN tag field and the Customer VLAN Tag field. Accordingly, the Ethernet packet header 800 is represented by the generic format of {22'b111111_111111_0000_0000_11}.

As illustrated in FIGS. 6A-8C, irrespective of the variation of an incoming Ethernet header, once the expansion of the Ethernet header to the generic format is performed, field offsets are the same as the biggest sized Ethernet header (e.g., Ethernet packet header 600 of FIG. 6A). The header expansion advantageously allows for the same set of software commands to work, irrespective of the incoming Ethernet header since the Ethernet header is expanded to the biggest sized Ethernet header. As such, a command modifying, for example, the EtherType field will always point to the same offset irrespective of which Ethernet header was received.

Generic formats of headers result in hardware and software flexibility in terms of modifying the packet headers. Hardware is able to modify the packet headers irrespective of where fields reside within the packet headers. Hardware can be programmed by software to support new protocols. Software programs generic formats in a hardware table for various header protocols.

Hypothetical 1 (incoming packet is a single tagged Ethernet packet and outgoing packet is an untagged Ethernet packet): Assume an input Ethernet port of the network switch is receiving packets with Customer VLAN tag, and the packets need to be forwarded as untagged to an output Ethernet port. FIG. 9A illustrates a format 900 of an exemplary Ethernet packet header of a packet received at this incoming Ethernet port. For the packet received at this incoming Ethernet port, software programs the generic format of the Ethernet header to be {22'b111111_111111_0000_1111_11}. The rewrite engine receives the header protocol layer and indexes to the memory, which tells the hardware that the generic format for this header protocol is {22'b111111_111111_0000_1111_11}. In this case, hardware expects the first 12 continuous bytes (each marked as 1), and the next six bytes (each marked as 1) to be shifted by four bytes. The four bytes corresponding to the four bits in the bit vector marked as 0 are invalid.

Based on the generic format of {22'b111111_111111_0000_1111_11}, the rewrite engine expands the incoming header protocol layer to the expanded header 905 shown in FIG. 9B and maintains a bit per byte for each byte of the expanded header layer 905. The corresponding bit vector 910 for the expanded header 905 is shown in FIG. 9C. The bit vector 910 tells the hardware which bytes are valid and which are invalid.

Based on the forwarding decision, in this Hypothetical 1, the packet needs to be forwarded as untagged. The hardware, based on the egress portType of the outgoing Ethernet port, indexes to a command table which tells the hardware to delete Customer VLAN Tag. Customer VLAN Tag always starts at a fixed offset, namely 16. Since the command is applied to a generic format, the command to delete Customer VLAN Tag is "delete 4 bytes (of Customer VLAN Tag) starting from location 16." The hardware simply marks the four bytes as invalid and deletes them. FIG. 9D illustrates the untagged Ethernet header 915 in a generic format. FIG. 9E illustrates the bit vector 920 for the untagged Ethernet header 915. After removing all the invalid bytes, the hardware forms the new header 925 shown in FIG. 9F. The packet with the new header 925 is sent out via the outgoing Ethernet port.

Figure 10A:
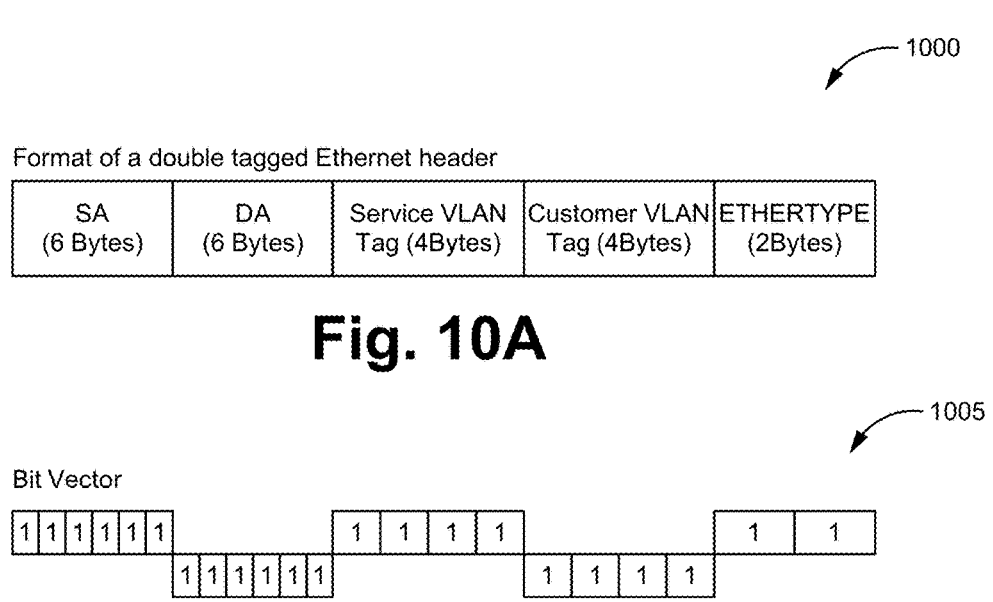

Hypothetical 2 (incoming packet is a double tagged Ethernet packet and outgoing packet is an untagged Ethernet packet): Assume an input Ethernet port of the network switch is receiving packets with Service VLAN tag and Customer VLAN tag, and the packets need to be forwarded as untagged to an output Ethernet port. FIG. 10A illustrates a format 1000 of an exemplary Ethernet packet header of a packet received at this incoming Ethernet port. For the packet received at this incoming Ethernet port, software programs the generic format of Ethernet header to be {22'b111111_111111_1111_1111_11}. The rewrite engine receives the header protocol layer and indexes to the memory, which tells the hardware that the generic format for this header protocol is {22'b111111_111111_1111_1111_11}. In this case, hardware expects all 22 continuous bytes (each marked as 1).

Figure 10B:
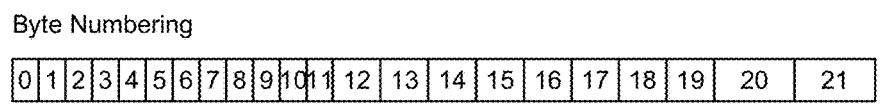

Based on the generic format of {22'b111111_111111_1111_1111_11}, the rewrite engine does not need to expand the incoming header protocol layer since the header protocol is already at its maximum size. The corresponding bit vector 1005 for the header 1000 is shown in FIG. 10B. The bit vector 1005 tells the hardware which bytes are valid and which are invalid.

Based on the forwarding decision, in this Hypothetical 2, the packet needs to be forwarded as untagged. The hardware, based on the egress portType of the outgoing Ethernet port, indexes to the command table which tells the hardware to delete Customer VLAN Tag and Service VLAN Tag. Customer VLAN Tag always starts at a fixed offset, namely 16. Similarly, Service VLAN Tag always starts at a fixed offset, namely 12. Since the commands are applied to a generic format, the command to delete Customer VLAN Tag is "delete 4 bytes (of Customer VLAN Tag) starting from location 16" and the command to delete Service VLAN Tag is "delete 4 bytes (of Service VLAN Tag) starting from location 12." The hardware simply marks the eight bytes as invalid and deletes them. FIG. 10C illustrates the untagged Ethernet header 1010 in a generic format. FIG. 10D illustrates the bit vector 1015 for the untagged Ethernet header 1010. After removing all the invalid bytes, the hardware forms the new header 1020 shown in FIG. 10E. The packet with the new header 1020 is sent out via the outgoing Ethernet port.

Hypothetical 3 (incoming packets is either an untagged, a single tagged or a double tagged Ethernet packet and outgoing packet is a double tagged Ethernet packet): Assume an input Ethernet port of the network switch is receiving packets with no tags, Service VLAN tag, Customer VLAN tag, or both tags, and the packets need to be forwarded to as double tagged, but with new tags, to an output Ethernet port. If an incoming packet is a double tagged, then software programs the generic format of the Ethernet header to be {22'b111111_111111_1111_1111_11}. If an incoming packet is untagged, then software programs the generic format of the Ethernet header to be {22'b111111_111111_0000_0000_11}. If an incoming packet is a single tagged, then software programs the generic format of the Ethernet header to be {22'b111111_111111_0000_1111_11}.

Based on the forwarding decision, in this Hypothetical 3, the packet needs to be forwarded as double tagged. The hardware, based on the egress portType of the outgoing Ethernet port, indexes to the command table which tells the hardware to replace Customer VLAN Tag and Service VLAN Tag. Customer VLAN Tag always starts at a fixed offset, namely 16. Similarly, Service VLAN Tag always starts at a fixed offset, namely 12. For each of these cases, the commands are the same. Since the commands are applied to a generic format, the commands are "copy 4 bytes (for Service VLAN Tag) from layerDatalocationX to startLocation=12" and "copy 4 bytes (for Customer VLAN Tag) from layerData.locationY to startLocation=16," wherein the contents are copied from locations specified by layerData.locationX and layerData.locationY.

As demonstrated in Hypotheticals 1-3, the rewrite engine is simplified in hardware and keeps the software command set in the memory small. Consequently, the hardware memory required to hold commands is shallow.

Figure 11:
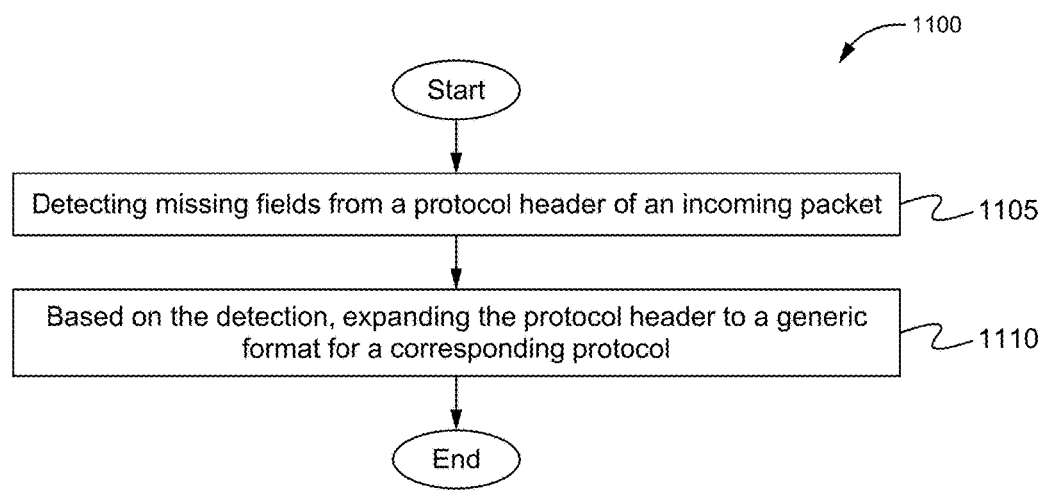
FIG. 11 illustrates a method of a rewrite engine in accordance with some embodiments of the present invention.

FIG. 11 illustrates a method 1100 of the rewrite engine in accordance with some embodiments of the present invention. At a step 1105, the rewrite engine detects missing fields from a protocol header of an incoming packet.

At a step 1110, based on the detection, the rewrite engine expands the protocol header to a generic format for a corresponding protocol. The generic format includes all possible fields of the protocol. Each of the fields has the same offset irrespective of which variation of the protocol the protocol header corresponds to. The rewrite engine maintains a bit vector for the expanded protocol header, wherein the bit vector includes a bit per byte for each byte of the expanded protocol header. The rewrite engine marks a bit as available for each byte of each valid field, wherein each valid field is a field existing in the protocol header of the incoming packet. The rewrite engine marks a bit as unavailable for each byte of each invalid field, wherein each invalid field is a field that did not exist in the protocol header of the incoming packet.

In some embodiments, the step 1105 and 1110 are performed for each protocol layer of the incoming packet.

Figure 12:
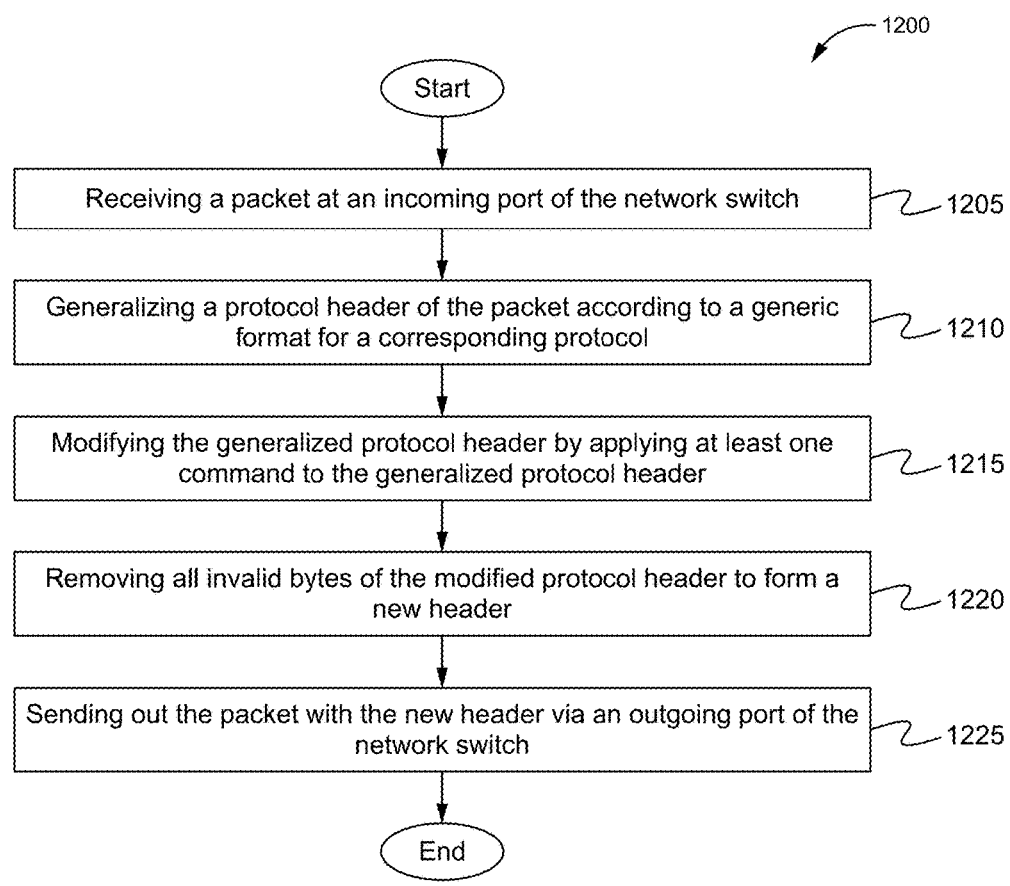
FIG. 12 illustrates yet another method of the network switch in accordance with some embodiments of the present invention.

FIG. 12 illustrates yet another method 1200 of the network switch in accordance with some embodiments of the present invention. In some embodiments, the network switch allows for software-defined mappings of generic formats of protocols and stores the software-defined mappings in the memory of the network switch. The network switch includes the rewrite engine to generalize protocol headers. At a step 1205, a packet is received at an incoming port of the network switch.

At a step 1210, a protocol header of the packet is generalized according to a generic format for a corresponding protocol. As explained above, hardware expands the protocol header according to one of the mappings stored in the memory of the network switch. A bit vector for the expanded bit vector tells hardware which bytes are valid and which bytes are invalid.

At a step 1215, the generalized protocol header is modified by applying at least one command to the generalized protocol header. As explained above, hardware, based on the egress portType of the outgoing Ethernet port, indexes to a command table to determine the at least one command to apply to the protocol header.

At a step 1220, all invalid bytes of the modified protocol header are removed to form a new header.

At a step 1225, the packet with the new header is sent out via an outgoing port of the network switch.

Figure 13:
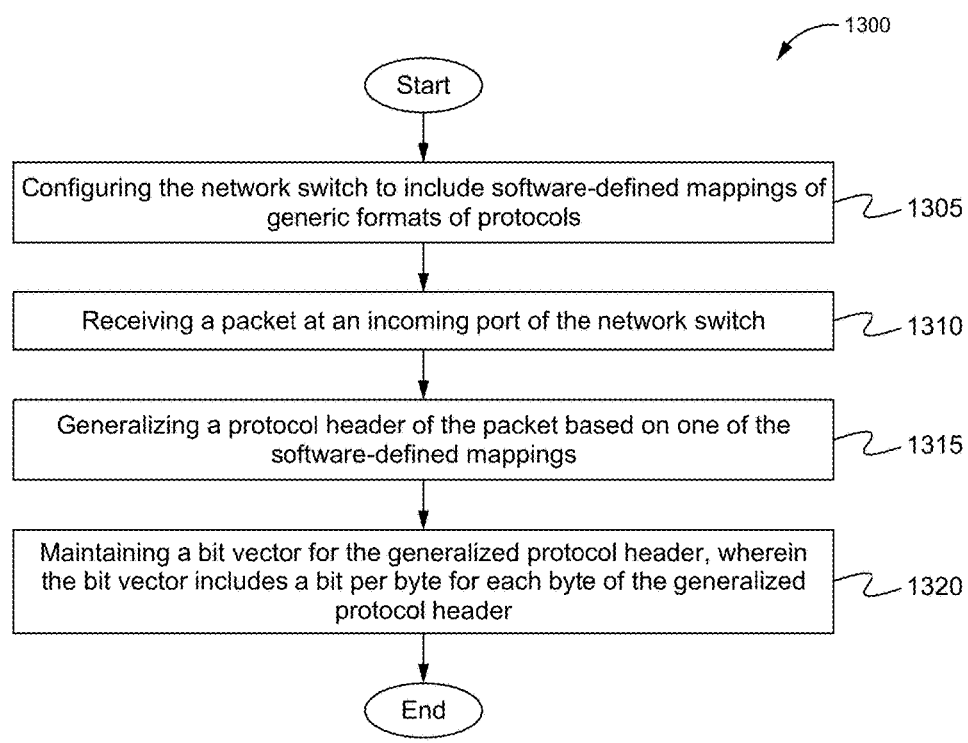
FIG. 13 illustrates yet another method of the network switch in accordance with some embodiments of the present invention.

FIG. 13 illustrates yet another method 1300 of the network switch in accordance with some embodiments of the present invention. At a step 1305, the network switch is configured to include software-defined mappings of generic formats of protocols. The software-defined mappings are stored in a memory of the network switch.

At a step 1310, a packet is received at an incoming port of the network switch.

At a step 1315, a protocol header of the packet is generalized based on one of the software-defined mappings.

At a step 1320, a bit vector for the generalized protocol header is maintained. The bit vector includes a bit per byte for each byte of the generalized protocol header.

Optimized Representation of Generalized Protocol Header

Each incoming layer can contain any number of bytes, such as 64 bytes or 128 bytes or even larger number of bytes. In the above examples, an expanded Ethernet header has 22 bytes. It is not efficient to represent all bytes of a protocol layer in a bit vector because allocating for the worst case protocol is memory intensive. In modern system-on-chip (SOC) designs, area and power budget of embedded memory usually dominates the entire chip budget. As a result, it is critical to efficiently utilizes the limited memory resources.

If most protocols have few "holes" or invalid bytes, then it is cheaper to represent a generic format header with a counter of continuous bytes and a smaller bit vector representing noncontiguous bytes. In some embodiments, the size of this smaller bit vector is typically fixed, although the size is programmable. The size can be adjusted based on statistics of protocols that determine the maximum number of noncontiguous bytes that has to be stored for a protocol to represent.

In some embodiments, each generic format header of a packet is represented in an optimized fashion that uses a data structure that includes two fields: a continuous_byte field and a bitvector field. The continuous_byte field represents the number of continuous valid bytes from start of a protocol layer. The bitvector field is a bit representation per byte of the protocol layer. The bitvector field shows "holes" or invalid bytes. The bitvector field is able to accommodate most all protocols if not all protocols. Therefore, the optimized representation can be represented by {continuous_byte, bitvector}. The data structure is independent of a size of the protocol header.

For example, the compact representation of the bit vector 605 of FIG. 6B is {22, 0000_0000_0000_0000), which represents 22 continuous bytes from the start of the Ethernet packet header 600 of FIG. 6A. The bitvector field contains all 0's because there are no invalid bytes.

For another example, the compact representation of the bit vector 705 of FIG. 7C is {12, 0000_1111_1100_000), which represents 12 continuous bytes from the start of the expanded Ethernet packet header 300' of FIG. 7B, followed by four invalid bytes and then six valid bytes.

For yet another example, the compact representation of the bit vector 805 of FIG. 8C is {12, 0000_0000_1100_0000), which represents 12 continuous bytes from the start of the expanded Ethernet packet header 800' of FIG. 8B, followed by eight invalid bytes and then two valid bytes.

Figure 14:
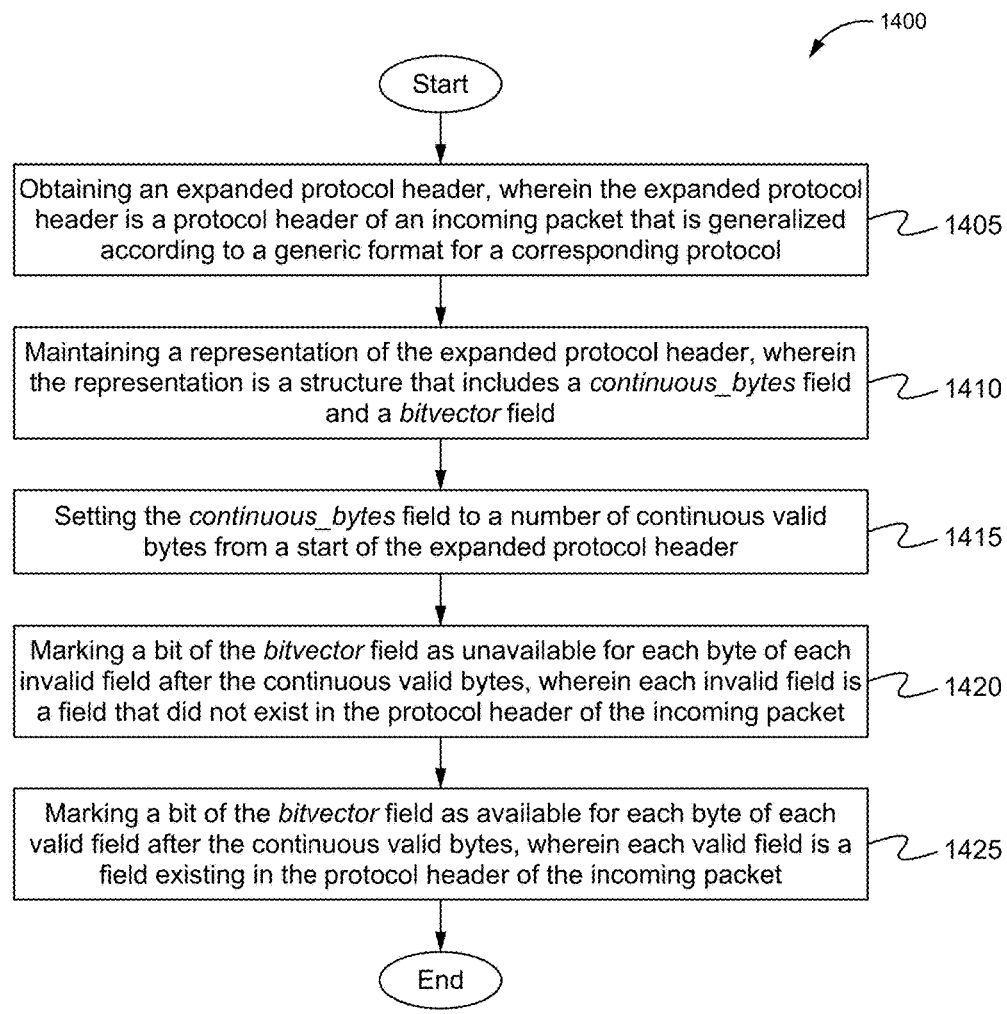
FIG. 14 illustrates yet another method of the network switch in accordance with some embodiments of the present invention.

FIG. 14 illustrates yet another method 1400 of the network switch in accordance with some embodiments of the present invention. At a step 1405, an expanded protocol header is obtained. As discussed above, the expanded protocol header is a protocol header of an incoming packet that is generalized according to a generic format for a corresponding protocol. Typically, the rewrite engine generalizes the protocol header by detecting missing fields from the protocol header and, based on the detection, expanding the protocol header according to the generic format. The generic format includes all possible fields of the protocol, wherein each of the fields has the same offset irrespective of which variation of the protocol the protocol header corresponds to.

At a step 1410, a representation of the expanded protocol header is maintained. The representation is a data structure that includes a continuous_byte field and a bitvector field.

At a step 1415, the continuous_byte field is set to a number of continuous valid bytes from a start of the expanded protocol header.

At a step 1420, a bit of the bitvector field is marked as unavailable for each byte of each invalid field after the continuous valid bytes. Each invalid field is a field that did not exist in the protocol header of the incoming packet.

At a step 1425, a bit of the bitvector field is marked as available for each byte of each valid field after the continuous valid bytes. Each valid field is a field existing in the protocol header of the incoming packet.

Figure 15:
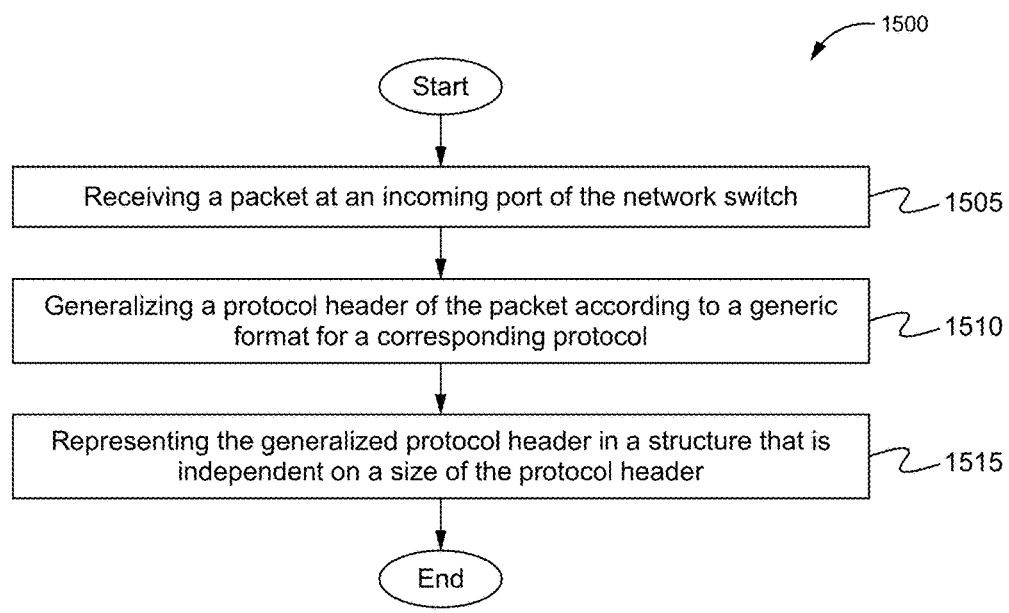
FIG. 15 illustrates yet another method of the network switch in accordance with some embodiments of the present invention.

FIG. 15 illustrates yet another method 1500 of the network switch in accordance with some embodiments of the present invention. At a step 1505, a packet is received at an incoming port of the network switch.

At a step 1510, a protocol header of the packet is generalized according to a generic format for a corresponding protocol. Typically, the rewrite engine configured to generalize the protocol header.

At a step 1515, the generalized protocol header is represented in a data structure that is independent of a size of the protocol header. In some embodiments, the data structure includes a continuous_byte field and a bitvector field, wherein the continuous_byte field represents the number of continuous valid bytes from a start of the protocol header, and the bitvector field is a bit representation per byte of the protocol header.

This data structure helps in generalizing the representation for various protocol layers and removes the dependency on the size of a protocol header layer. The compact representation of a bit vector advantageously reduces hardware costs.

Generic Commands for Header Modification

Modification uses a set of generic commands that is applied to expanded protocol headers. All of the commands are thus generic as these commands are independent of incoming headers (e.g., size and protocol).

Table 1 lists generic commands used by the rewrite engine for protocol header modifications. This small set of generic commands is used for header modification irrespective of incoming packet headers (e.g., size, protocol) as packet headers are generalized prior to modification. Typically, the generic commands behave as a microcode that the software programs.

TABLE 1

| Command | Description |
| --- | --- |
| CMD: DELETE Parameters: Start, Size | Starting at the Start position, this delete command deletes Size number of bytes in a given protocol layer. Keeps track of how many bytes is deleted. |
| CMD: COPY Parameters: Source, SourceOffset, Size, Destination Offset, Bitmask, copyConstant-BitMask, copyConstantData | This copy command copies data from various sources such as extracted layer data, common fields extracted by the parser, current layer of the header and copies them to the current header layer starting at DestinationOffset.<br>For all the bytes that are valid in source, this copy command makes the corresponding destination bytes valid.<br>For all the bytes that are invalid in source, this copy command invalidates the bytes in the destination. (This copy command can also act as the delete command in this case.)<br>If value of a bit in copyConstantBitMask is 1, corresponding data byte comes from constant data. This allows specifying constant values using this copy command.<br>Keeps track of how many bytes is added or deleted. |
| CMD: MOVE Parameters: StartOffset, Destination-Offset, Size | This move command moves the bytes within the protocol layer. This move command is primarily used to Push and Pop MPLS labels efficiently.<br>For all the bytes that are valid in source, this move command copies the corresponding data in the destination, validates the destination bytes and invalidates the source bytes.<br>For all the bytes that are invalid in source, this move command invalidates the destination bytes and the source bytes.<br>Keeps track of how many bytes is added or deleted. |

The DELETE command deletes Size bytes within the current generalized protocol layer from Start position by invalidating those bytes. Bits of a bit vector representing those bytes are marked as 0.

The COPY command copies data of Size bytes from SourceOffset of Source to DestinationOffset of the current generalized header layer. The COPY command makes the corresponding destination bytes either valid or invalid depending on whether the validity of the data is valid in Source. Bits of a bit vector representing invalid bytes are marked as 0. Bits of a bit vector representing valid bytes are marked as 1. The COPY command can also use Bitmask for bitmask operations. The COPY command can also use copyConstantBitMask and copyConstantData. If copyConstantBitMask contains a "1" at a bit location, a byte from the corresponding position in copyConstantData is copied into the current generalized header layer at the corresponding position. In some embodiments, the constant data is stored in a table. In some embodiments, the constant data is software-defined.

The MOVE command moves Size bytes within the current generalized protocol layer from StartOffset to DestinationOffset. The MOVE command makes the corresponding destination bytes either valid or invalid depending on whether the validity of the data is valid in Source, and makes the source bytes invalid. Bits of a bit vector representing invalid bytes are marked as 0. Bits of a bit vector representing valid bytes are marked as 1.

The number of bytes added or deleted is counted for all operations performed by using at least one counter. The at least one counter is a hardware counter. Alternatively, the at least one counter is a software counter. The at least one counter keeps track of the count for statistical purposes and for other reasons. In some embodiments, the rewrite engine performs an XOR operation on two bit vectors—the original one with the modified one—to tell hardware how many bits changed, which is used for accounting the number of bytes deleted or added.

Figure 16:
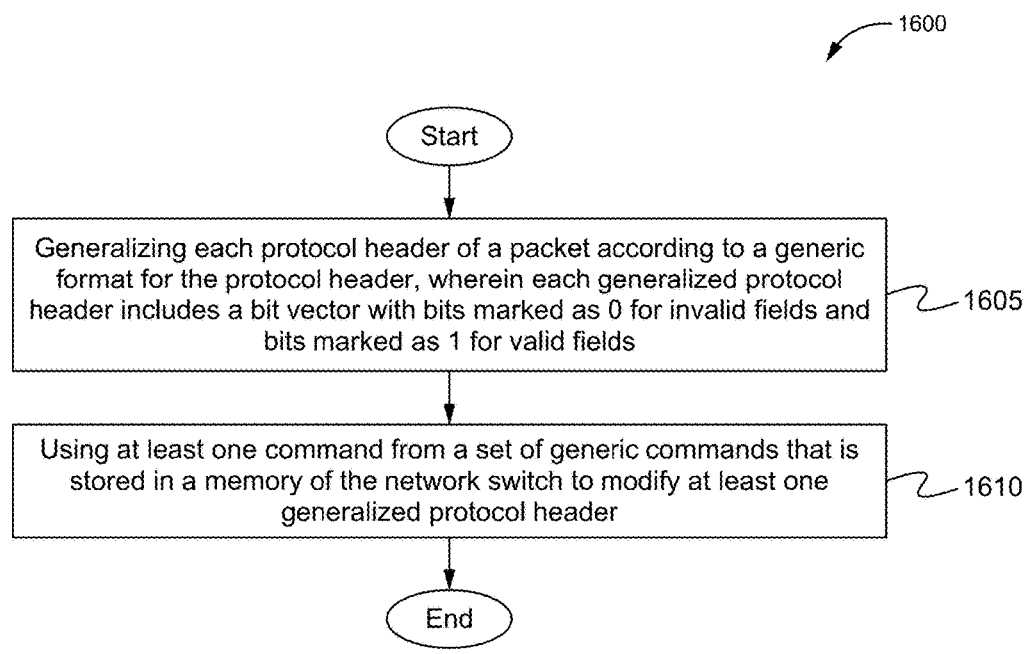
FIG. 16 illustrates another method of the rewrite engine in accordance with some embodiments of the present invention.

FIG. 16 illustrates another method 1600 of the rewrite engine in accordance with some embodiments of the present invention. The rewrite engine is part of the network switch and modifies packets before they are transmitted out of the network switch. At a step 1605, each protocol header of a packet is generalized according to a generic format for the protocol header. The generic format includes all possible fields of the protocol. As such, each of the fields has the same offset irrespective of which variation of the protocol the protocol header corresponds to. Each generalized protocol header includes a bit vector. The bit vector includes a bit per byte for each byte of the generalized protocol header. The bit vector includes with bits marked as 0 for invalid fields and bits marked as 1 for valid fields. Here, an invalid field is a field that did not exist in the protocol header of the received packet, and a valid field is a field that exist in the protocol header of the received packet.

At a step 1610, at least one command from a set of generic commands that is stored in a memory of the network switch is used to modify at least one generalized protocol header. The modification of the at least one generalized protocol header is based on egress portType of an outgoing port of the network switch. The modification of the at least one generalized protocol header results in the bit vector being updated.

Since the set of generic commands is used for header modification irrespective of incoming packet headers, the set of generic commands can be used to modify a packet header of a first variation of a protocol and to modify a packet header of a second variation of the protocol. Similarly, the set of generic commands can be used to modify a packet header of a first protocol and to modify a packet header of a second protocol.

Figure 17:
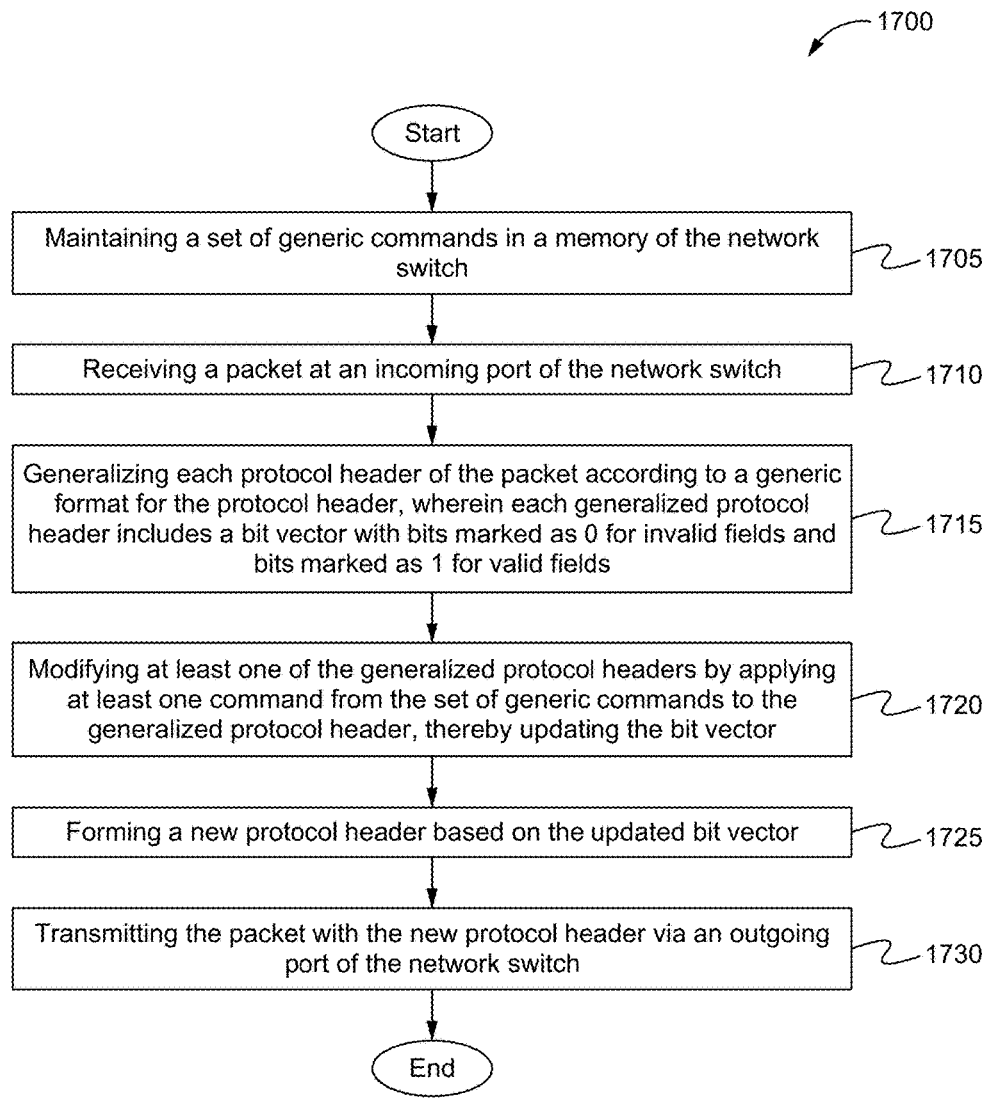
FIG. 17 illustrates yet another method of the network switch in accordance with some embodiments of the present invention.

FIG. 17 illustrates yet another method 1700 of the network switch in accordance with some embodiments of the present invention. At a step 1705, a set of generic commands is maintained in the memory of the network switch.

At a step 1710, a packet is received at an incoming port of the network switch.

At a step 1715, each protocol header of the packet is generalized according to a generic format for the protocol header. Missing fields from the protocol header of the packet are detected. Based on the detection, the protocol header is expanded to the generic format by including the missing fields. Each generalized protocol header includes a bit vector with bits marked as 0 for invalid fields and bits marked as 1 for valid fields. Here, an invalid field is a field that did not exist in the protocol header of the received packet, and a valid field is a field that exist in the protocol header of the received packet.

At a step 1720, at least one of the generalized protocol headers is modified by applying at least one command from the set of generic commands to the generalized protocol header, thereby updating the bit vector.

At a step 1725, a new protocol header is formed based on the updated bit vector.

At a step 1730, the packet with the new protocol header is transmitted via an outgoing port of the network switch. In some embodiments, prior to the packet with the new protocol header is transmitted, a number of bytes added or deleted is counted for all operations performed.

Using Bit Vectors to Collapse Modified Protocol Headers

The rewrite engine not only uses a bit vector for each protocol header to allow expansion of the protocol header based a generic format for modification, the rewrite engine also uses the bit vector to allow collapse of the protocol header from the generic format to a "regular" header. Typically, each bit in the bit vector represents a byte of the generalized protocol header. A bit marked as 0 in the bit vector corresponds to an invalid byte, while a bit marked as 1 in the bit vector corresponds to a valid byte. The rewrite engine uses the bit vector to remove all the invalid bytes after all commands have been operated on the generalized protocol header to thereby form a new protocol header. The rewrite engine therefore uses bit vectors to allow expansion and collapse of protocol headers of packets, thereby enabling flexible modification of the packets by using a set of generic commands.

For example, referring back to Hypothetical 1, the bit vector 920 of FIG. 9E represents the modified protocol header 915 of FIG. 9D after the Delete command has been applied to generalized protocol header 905 of FIG. 9B. In this Hypothetical 1, Customer VLAN Tag is deleted, thereby invalidating the four bytes of Customer VLAN Tag. As such, the bits in the bit vector 920 that correspond to Customer VLAN Tag are marked as 0. After all commands have been operated on, namely the Delete command in Hypothetical 1, the rewrite engine uses the bit vector 920 to remove all the invalid bytes, thereby collapsing the bit vector 920. A new protocol header is formed based on the collapse bit vector. FIG. 9F illustrates the new protocol header 925 after all the invalid bytes are removed. The packet in Hypothetical 1 with the new header 925 is sent out via the outgoing Ethernet port.

For another example, referring back to Hypothetical 2, the bit vector 1015 of FIG. 10D represents the modified protocol header 1010 of FIG. 10C after the Delete commands have been applied to the protocol header 1000 of FIG. 10A. In this Hypothetical 2, Service VLAN Tag and Customer VLAN Tag are deleted, thereby invalidating the four bytes of Service VLAN Tag and the four bytes of Customer VLAN Tag. As such, the bits in the bit vector 1015 that correspond to Service VLAN Tag and Customer VLAN Tag are marked as 0. After all commands have been operated on, namely the two Delete commands in Hypothetical 2, the rewrite engine uses the bit vector 1015 to remove all the invalid bytes, thereby collapsing the bit vector 1015. A new protocol header is formed based on the collapse bit vector. FIG. 10E illustrates the new protocol header 1020 after all the invalid bytes are removed. The packet in Hypothetical 2 with the new header 1020 is sent out via the outgoing Ethernet port.

Figure 18:
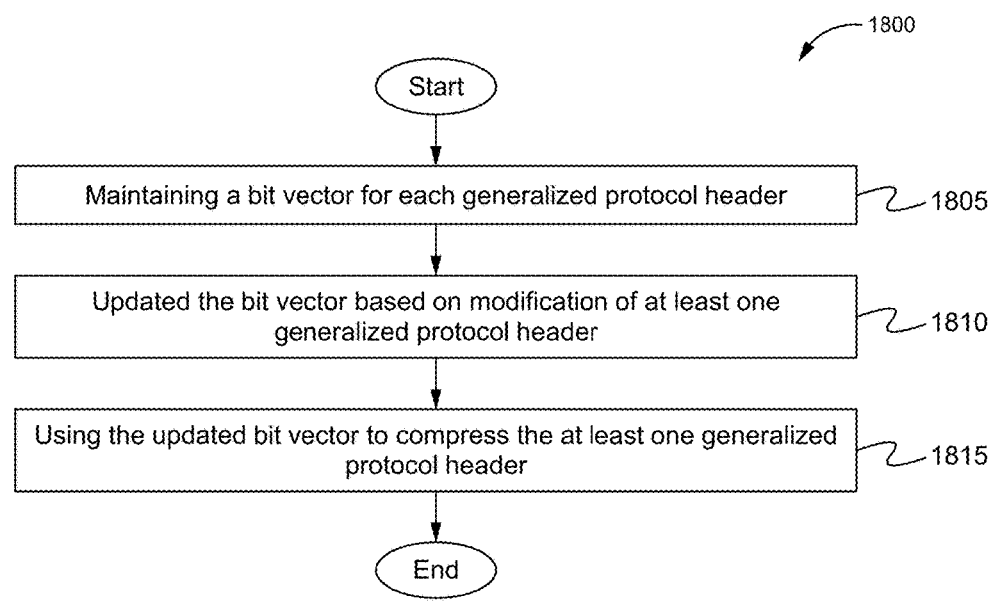
FIG. 18 illustrates yet another method of the rewrite engine in accordance with some embodiments of the present invention.

FIG. 18 illustrates yet another method 1800 of the rewrite engine in accordance with some embodiments of the present invention. The rewrite engine is part of the network switch and modifies packets before they are transmitted out of the network switch. At a step 1805, a bit vector for each generalized protocol header is maintained. The generalized protocol header is a protocol header of a packet expanded to a generic format. The generic format includes all possible fields of the protocol. Each of the fields has the same offset irrespective of which variation of the protocol the protocol header corresponds to. The bit vector includes a bit per byte for each byte of the generalized protocol header.

At a step 1810, the bit vector is updated based on modification of at least one generalized protocol header. The modification uses at least one command from a set of generic commands that is stored in a memory of the network switch to modify the at least one generalized protocol header.

At a step 1815, the updated bit vector is used to compress the at least one generalized protocol header. In some embodiments, prior to the step 1815, an XOR operation is performed on the bit vector and the updated bit vector to determine how many bits changed, which allows the rewrite engine to account for the bytes deleted and added.

Figure 19:
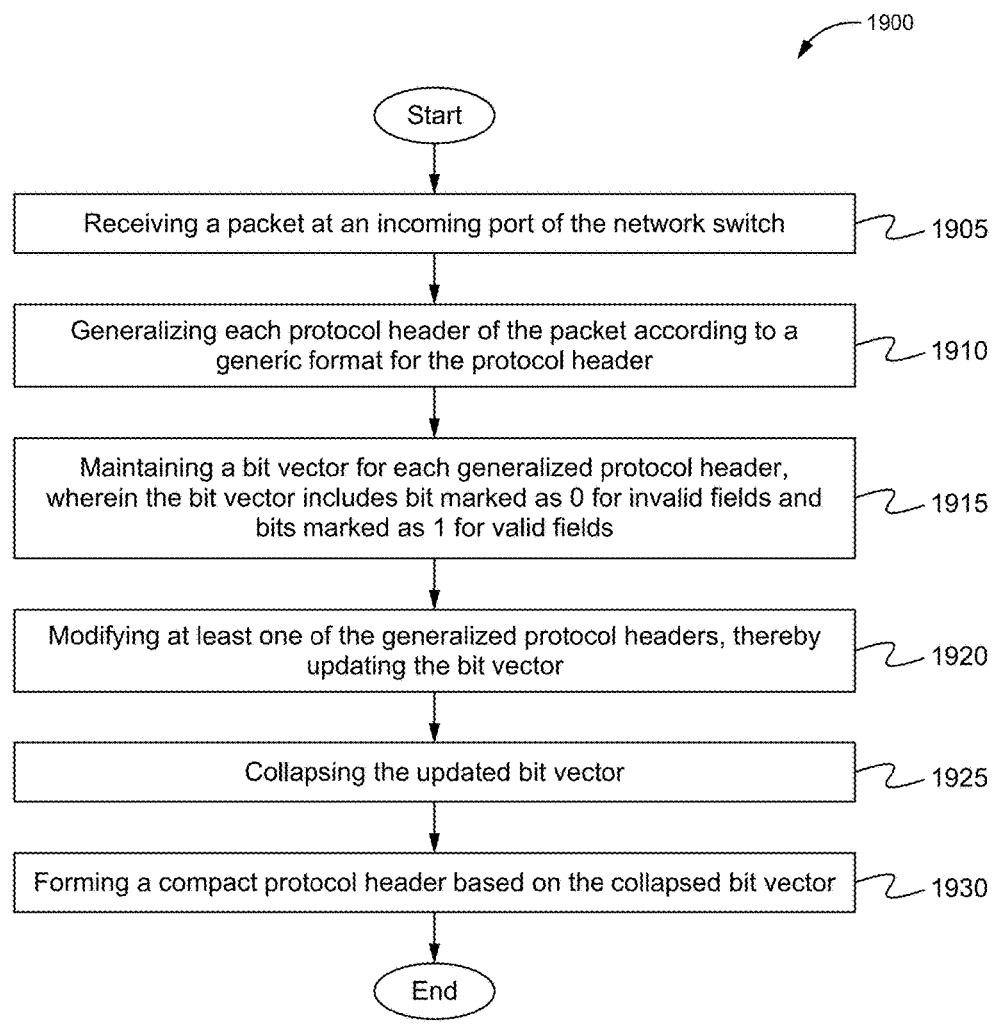
FIG. 19 illustrates yet another method of the network switch in accordance with some embodiments of the present invention.

FIG. 19 illustrates yet another method 1900 of the network switch in accordance with some embodiments of the present invention. At a step 1905, a packet is received at an incoming port of the network switch.

At a step 1910, each protocol header of the packet is generalized according to a generic format for the protocol header. Missing fields from the protocol header of the packet are detected. Based on the detection, the protocol header is expanded to the generic format by including the missing fields.

At a step 1915, a bit vector for each generalized protocol header is maintained. The bit vector includes bits marked as 0 for invalid fields and bits marked as 1 for valid fields.

At a step 1920, at least one of the generalized protocol header is modified, thereby updating the bit vector. The modification uses at least one command from a set of generic commands that is stored in a memory of the network switch to modify the at least one generalized protocol header. The modification of the at least one generalized protocol header is based on egress portType of the outgoing port of the network switch.

At a step 1925, the updated bit vector is collapsed by shifting the updated bit vector to remove each bit marked as 0 in the updated bit vector.

At a step 1930, a compact protocol header is formed based on the collapsed bit vector. The packet with at least the compact protocol header is transmitted via an outgoing port of the network switch. In some embodiments, prior to the packet being transmitted, a number of bytes added or deleted for all operations performed is counted.

Pointer Structure

A pointer structure can be used to extract the different protocol layers within an incoming packet for generalization and to reconstruct the packet after modifications of the protocol layers. The pointer structure includes N+1 layer pointers and a total size of all headers of the packet. Typically, the pointer structure is initially updated with data provided by the parser engine for use by the rewrite engine to split the packet into individual layers and to thereafter intelligently stitch them back together. After the packet is split into individual layers, the rewrite engine generalizes the protocol headers, modifies the generalized protocol headers and compresses the generalized protocol headers by removing all invalid bytes. The layer pointers are updated by the rewrite engine after each layer is modified. These updated layer pointers are used to stitch the different protocol layers back together prior to transmitting the packet out of the network switch.

Figure 20:
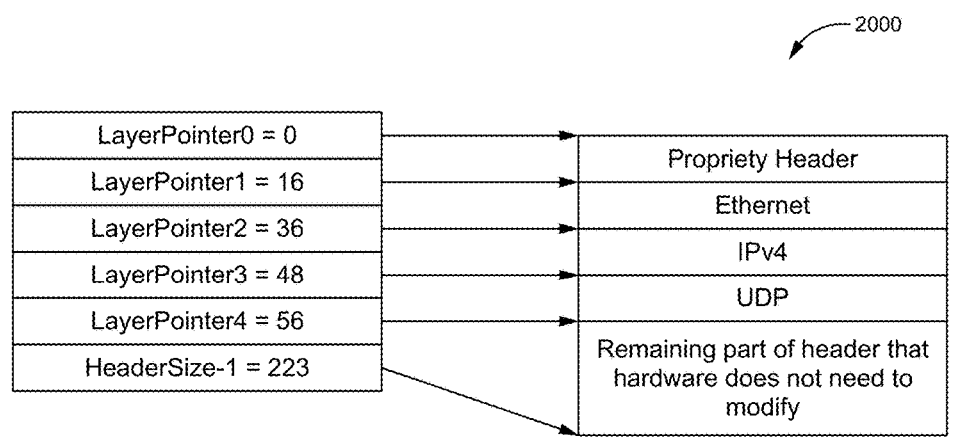
FIG. 20 illustrates an exemplary diagram of a layer structure in accordance with some embodiments of the present invention.

FIG. 20 illustrates and exemplary diagram 2000 of the layer structure in accordance with some embodiments of the present invention. Assume an incoming packet includes the following protocol layers: proprietary header, Ethernet, IPv4, UDP, VxLAN and Ethernet. Also assume the parser engine of the network switch is able to parse up to eight layers while the rewrite engine is able to only modify first N, such as N=4, protocol layers (because of either software requirement and/or hardware capability). In some embodiments, the parser engine provides data, such as the start location of each protocol header of the packet, to the rewrite engine.

Since the rewrite engine is able to modify the first four protocol layers of the packet, the rewrite engine uses only relevant data from the parser engine, namely data regarding the first four protocol layers: propriety header, Ethernet, IPv4 and UDP. Using this data, the pointer structure for the packet is initialized: a LayerPointer0 that is set to 0, which is the starting location for proprietary header (i.e., layer 0) within the packet, a LayerPointer1 that is set to 16, which is the starting location for the Ethernet header (i.e., layer 1) within the packet, a LayerPointer2 that is set to 36, which is the starting location for IPv4 header (i.e., layer 2) within the packet, a LayerPointer3 that is set to 48, which is the starting location for UDP header (i.e., layer 3) within the packet, and a LayerPointer4 that is set to 56, which is the starting location for the remaining part of the headers that the rewrite engine does not modify. In some embodiments, the rewrite engine calculates the size of the headers and sets HeaderSize (i.e., total size of all headers) to 223.

By using the layer pointers, the rewrite engine generalizes the first four protocol layers (i.e., proprietary header, Ethernet, IPv4, UDP), as discussed above, for modification. After modification, the rewrite engine compresses the modified protocol headers by removing all the invalid bytes. Typically, the layer pointers are updated after the protocol headers are modified.

The layer pointers form an end pointer. The end pointer together with the HeaderSize is associated with a body of the headers, which is the portion of the header that is not modified and is carried forward for subsequent stitching. After all the modifications are performed and the modified protocol headers are compressed, the modified layer pointers are used to stitch the modified headers back together with the body of the headers.

The rewrite engine can be limited to a number of layers the rewrite engine can modify. In some embodiments, the rewrite engine can also be limited to how much the rewrite engine can expand any given protocol layer to. In such embodiments, the rewrite engine extracts the size of a protocol layer by subtracting two adjacent layer pointers. If the layer size exceeds the hardware capability of the rewrite engine, the rewrite engines simply uses the previous layer pointer and forms the body intelligently.

Assume a protocol layer cannot be expanded more than 40 bytes but the biggest variation of the associated protocol is 64 bytes. In some embodiments, the rewrite engine expands the header protocol to the maximum 40 bytes for modification. After modification, using the layer pointers, the rewrite engine is able to similarly stitch the remaining bytes to the modified bytes.

Use of layer pointers significantly reduces hardware logic and complexity as it needs to deal with only one given protocol layer. The scope of hardware commands is limited to a given layer. Since the commands engine has no dependency on the preceding layer or the layer following it, the commands hardware can be used in a multi-pass fashion if more commands are needed per layer. Put differently, since the commands have no internal state associated with the commands, multiple commands can be used in parallel. Similarly, multiple layers can be modified in parallel.

Figure 21:
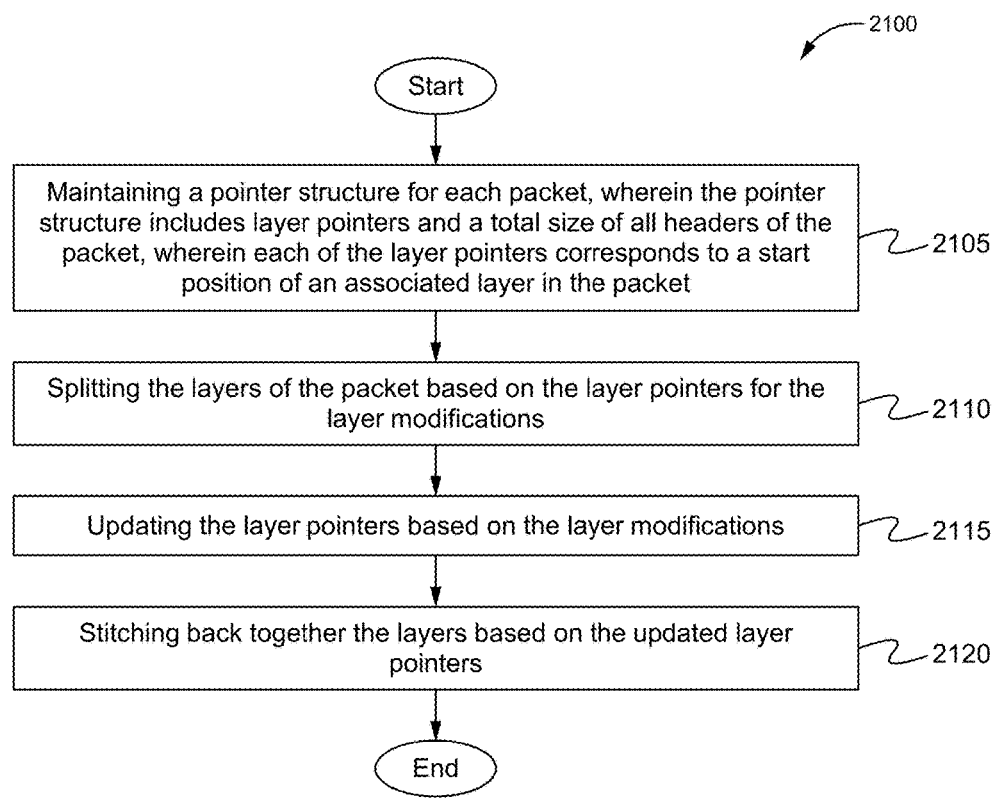
FIG. 21 illustrates yet another method of the rewrite engine switch in accordance with some embodiments of the present invention.

FIG. 21 illustrates yet another method 2100 of the rewrite engine in accordance with some embodiments of the present invention. The rewrite engine is part of the network switch and modifies packets before they are transmitted out of the network switch. At a step 2105, a pointer structure for each packet is maintained. The pointer structure includes layer pointers and a total size of all headers of the packet. Each of the layer pointers corresponds to a start position of an associate layer in the packet.

The pointer structure includes N+1 layer pointers. The rewrite engine modifies N layers of the packet. The layer pointers form an end pointer. The end point with the total size indicates a body of the headers. The body of the headers is a portion of the headers that is not modified by the rewrite engine.

At a step 2110, the layers of the packet are split based on the layer pointers for layer modifications. Missing fields from a protocol header of the packet are detected. Based on the detection, the protocol header is expanded to a generic format for a corresponding protocol. The generic format includes all possible fields of the protocol. Each of the fields have the same offset irrespective of which variation of the protocol the protocol header corresponds to. Each generalized protocol header includes a bit vector with bits marked as unavailable or 0 for invalid fields and bits marked as available or 1 for valid fields. At least one command from a set of generic commands is used to modify the generalized protocol header. Typically, the bit vector is updated after the modification.

At a step 2115, the layer pointers are updated based on the layer modifications.

At a step 2120, the layers are stitched back together based on the updated layer pointers.

Figure 22:
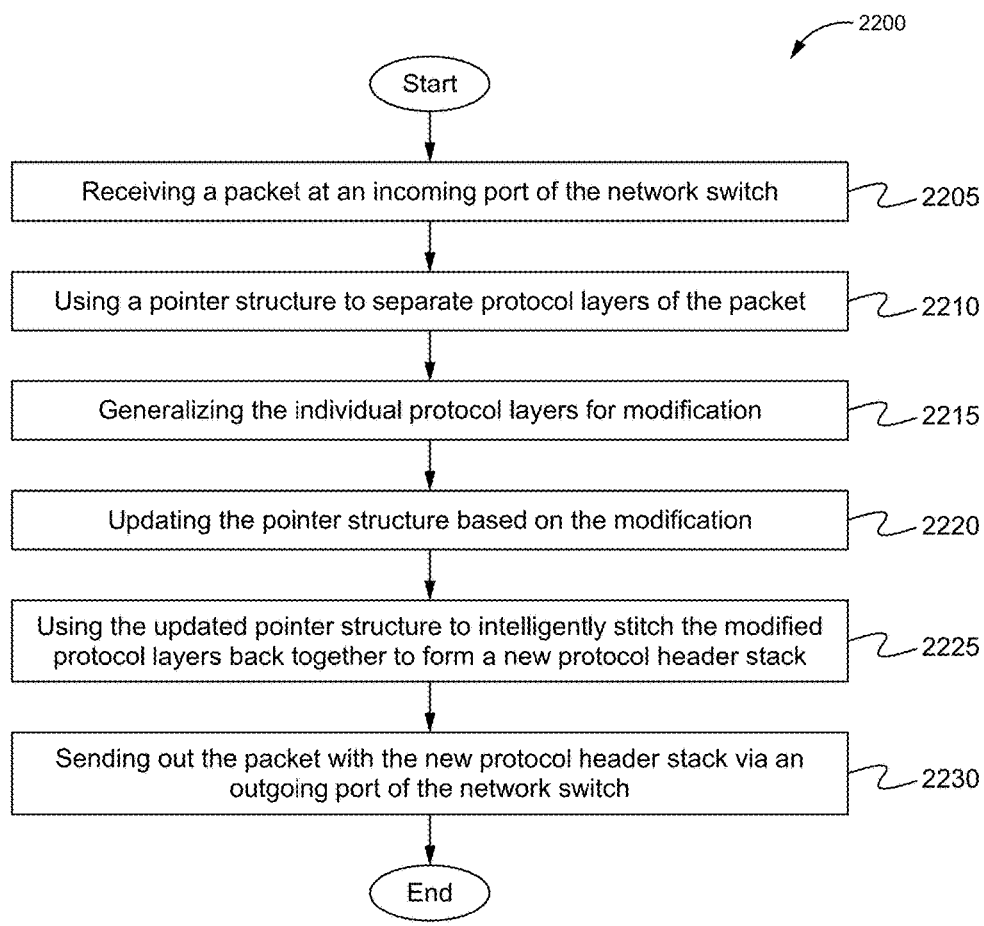
FIG. 22 illustrates yet another method of the network switch in accordance with some embodiments of the present invention.

FIG. 22 illustrates yet another method 2200 of the network switch in accordance with some embodiments of the present invention. At a step 2205, a packet is received at an incoming port of the network switch.

At a step 2210, a pointer structure is used to separate protocol layers of the packet. The pointer structure includes N+1 layer pointers to N+1 locations of the packet and a total size of all headers of the packet. The locations include starting positions of the protocol layers. The pointer structure is initialized based on parsed data of the packet.

At a step 2215, the separated protocol layers are generalized for modification. For each layer, the size of the layer is extracted to determine whether the size exceeds hardware capability for modifying the layer. The size is extracted by subtracting two adjacent layer pointers in the pointer structure. Based on the determination, a first of the two adjacent layer pointers is used and a body is formed.

At a step 2220, the pointer structure is updated based on the modification.

At a step 2225, the updated pointer structure is used to intelligently stitch the modified protocol layers back together to form a new protocol header.

At a step 2230, the packet with the new protocol header is sent out via an outgoing port of the network switch.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method of a rewrite engine of a network switch, the method comprising:
    maintaining a bit vector for a generalized protocol header layer of a packet, wherein the bit vector comprises a plurality of values that each represent a different portion of the generalized protocol header layer;
    updating the bit vector based on modification of the generalized protocol header layer; and
    using the updated bit vector to compress the generalized protocol header layer by removing fields from the generalized protocol header layer based on the updated bit vector.

2. A method of a rewrite engine of a network device, the method comprising:
    maintaining a bit vector for a generalized protocol header layer of a packet;
    updating the bit vector based on modification of the generalized protocol header layer; and
    using the updated bit vector to compress the generalized protocol header layer, wherein the generalized protocol header layer is a protocol header layer of the packet expanded to a generic format, and further wherein the generic format includes all possible fields supported by a protocol of the protocol header layer, wherein each of the fields has the same offset irrespective of which variation of the protocol the protocol header layer corresponds to.

3. The method of claim 1, wherein the bit vector includes a bit per byte for each byte of the generalized protocol header layer.

4. The method of claim 1, wherein the modification uses at least one command from a set of generic commands that is stored in a memory of the network switch to modify the generalized protocol header layer.

5. A method of a rewrite engine of a network device, the method comprising:
    maintaining a bit vector for a generalized protocol header;
    updating the bit vector based on modification of at least one generalized protocol header;
    using the updated bit vector to compress the at least one generalized protocol header; and
    prior to using the updated bit vector, performing an XOR operation on the bit vector and the updated bit vector to determine how many bits changed.

6. A method of a network switch, the method comprising:
    receiving a packet having a header including a plurality of protocol header layers at an incoming port of the network switch;

generalizing each of the protocol header layers of the packet according to a generic format for the protocol header layer thereby forming generalized protocol header layers;

maintaining a bit vector for each of the generalized protocol header layers, wherein the bit vector comprises a plurality of values that each represent a different portion of the generalized protocol header layer and further wherein the bit vector includes bits marked as a first value for invalid fields and bits marked as a second value for valid fields;

modifying at least one of the generalized protocol header layers and updating the bit vector associated with the at least one of the generalized protocol header layers thereby forming an updated bit vector;

collapsing the updated bit vector forming a compress bit vector; and forming a new protocol header based on the compressed bit vector.

7. The method of claim 6, wherein generalizing each of the protocol header layers includes:
detecting missing fields from the protocol header layer of the packet; and
based on the detection, expanding the protocol header layer to the generic format by including the missing fields.

8. The method of claim 6, wherein the modification uses at least one command from a set of generic commands that is stored in a memory of the network switch to modify the at least one of the generalized protocol header layers.

9. The method of claim 6, wherein the modification of the at least one of the generalized protocol header layers is based on egress portType of the outgoing port of the network switch.

10. A method of a network switch, the method comprising:
receiving a packet having a header including a plurality of protocol header layers at an incoming port of the network switch;
generalizing each of the protocol header layers of the packet according to a generic format for the protocol header layer thereby forming generalized protocol header layers;
maintaining a bit vector for each of the generalized protocol header layers, wherein the bit vector includes bits marked as a first value for invalid fields and bits marked as a second value for valid fields;
modifying at least one of the generalized protocol header layers and updating the bit vector forming an updated bit vector;
collapsing the updated bit vector forming a compress bit vector; and
forming a new protocol header based on the compressed bit vector wherein collapsing the updated bit vector includes shifting the updated bit vector by removing each bit marked as the first value in the updated bit vector.

11. The method of claim 6, further comprising transmitting the packet with at least the new protocol header via an outgoing port of the network switch.

12. A method of a network switch, the method comprising:
receiving a packet having a header including a plurality of protocol header layers at an incoming port of the network switch;

generalizing each of the protocol header layers of the packet according to a generic format for the protocol header layer thereby forming generalized protocol header layers;

maintaining a bit vector for each of the generalized protocol header layers, wherein the bit vector includes bits marked as a first value for invalid fields and bits marked as a second value for valid fields;

modifying at least one of the generalized protocol header layers and updating the bit vector forming an updated bit vector;

collapsing the updated bit vector forming a compress bit vector; and forming a new protocol header based on the compressed bit vector, before transmitting the packet with at least the new protocol header, counting a number of bytes added or deleted for all operations performed.

13. A network switch comprising:
an input port for receiving a packet;
a memory storing a set of generic commands, wherein the set of generic commands is used for protocol header layer modifications irrespective of which variations of supported protocol variations incoming protocol header layers are; and
a rewrite engine using bit vectors to allow expansion and collapse of protocol header layers of the packet, thereby enabling flexible modification of the packet by using the set of generic commands, wherein each of the bit vectors comprises a plurality of values that each represent a different portion of one the protocol header layers to which the bit vector corresponds.

14. The network switch of claim 13, wherein the set of generic commands include a Delete command, a Copy command and a Move command.

15. The network switch of claim 13, wherein each of the protocol header layers is generalized according to one of a plurality of software-defined mappings that is specific to a protocol of the protocol header layer.

16. The network switch of claim 13, wherein the software-defined mappings are stored in the memory.

17. The network switch of claim 15, wherein each generalized protocol header layer includes a bit vector with bits marked as a first value for invalid fields and bits marked as a second value for valid fields.

18. The network switch of claim 17, wherein the rewrite engine updates the bit vector after the generalized protocol header layer is modified.

19. The network switch of claim 18, wherein the rewrite engine collapses the updated bit vector by removing each bit marked as the first value in the updated bit.

20. The network switch of claim 19, wherein a new protocol header layer is formed based on the collapsed bit vector.

21. The network switch of claim 19, further comprising an outgoing port for transmitting the packet with the new protocol header layer.

22. The network switch of claim 13, wherein the rewrite engine is configured to expand each of the protocol header layers to a generic format that corresponds to a protocol of the protocol header layer and includes all fields supported by the protocol of the protocol header layer, wherein each of the fields has the same offset irrespective of which variation of the protocol the protocol header layer corresponds to.

23. A network switch comprising:
an input port for receiving a packet, wherein the packet includes a body and a header having a plurality of protocol layers forming a protocol stack;

an output port for transmitting modified packets;
a memory to store a set of software-defined mappings of generic formats of protocols and a set of generic modification commands, wherein the set of generic modification commands is used for protocol header layer modifications irrespective of which variations of supported protocol variations incoming protocol header layers are; and
a rewrite engine to:
  convert each of the protocol header layers of the protocol stack into a generic format based on one from the set of software-defined mappings thereby forming converted protocol header layers;
  maintain a bit vector for each of the converted protocol header layers, wherein each of the bit vectors comprises a plurality of values that each represent a different portion of one the converted protocol header layers to which the bit vector corresponds;
  use the set of generic modifications commands to modify each of the converted protocol header layers;
  update each of the bit vectors after the bit vector thereby forming updated bit vectors;
  collapse each of the updated bit vectors to thereby form a new protocol stack; and
  attach the new protocol stack with the body to be transmitted via the output port.

24. The network switch of claim 23, wherein the bit vector includes a bit per byte for each byte of the converted protocol header.

25. The network switch of claim 24, wherein the bit vector includes bits marked as a first value for invalid fields of the converted protocol header and bits marked as a second value for valid fields of the converted protocol header.

* * * * *